United States Patent
Matsuno et al.

(10) Patent No.: US 6,661,772 B2
(45) Date of Patent: Dec. 9, 2003

(54) DIGITAL SIGNAL TRANSMISSION APPARATUS

(75) Inventors: Kazuyoshi Matsuno, Sagamihara (JP); Hideki Ishibashi, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 09/931,926

(22) Filed: Aug. 20, 2001

(65) Prior Publication Data

US 2001/0055272 A1 Dec. 27, 2001

Related U.S. Application Data

(63) Continuation of application No. PCT/JP00/09047, filed on Dec. 20, 2000.

(30) Foreign Application Priority Data

Dec. 20, 1999 (JP) .............................................. 11-361288

(51) Int. Cl.⁷ ............................. H04L 12/26; H04J 3/06; H04J 3/02; G06F 15/177; G06F 15/16
(52) U.S. Cl. ........................ 370/216; 370/539; 370/532; 370/512; 709/220; 709/246
(58) Field of Search ................................. 370/216, 228, 370/230, 231, 248, 466, 512, 532, 536, 537, 542; 709/220, 221, 226, 246

(56) References Cited

U.S. PATENT DOCUMENTS

| | | | | |
|---|---|---|---|---|
| 5,369,633 A | * | 11/1994 | Maruyama et al. | 370/366 |
| 5,404,541 A | * | 4/1995 | Hirosawa et al. | 713/324 |
| 5,515,362 A | * | 5/1996 | Iwase | 370/228 |
| 5,600,648 A | * | 2/1997 | Furuta et al. | 370/248 |
| 5,636,204 A | * | 6/1997 | Mizuno et al. | 370/245 |
| 5,640,117 A | * | 6/1997 | Tanoi | 327/231 |
| 5,661,720 A | * | 8/1997 | Taniguchi | 370/223 |
| 5,663,820 A | * | 9/1997 | Shiragaki | 359/128 |
| 5,694,329 A | * | 12/1997 | Pomatto | 700/286 |
| 5,818,846 A | * | 10/1998 | Mori et al. | 370/532 |
| 6,011,802 A | * | 1/2000 | Norman | 370/466 |
| 6,061,329 A | * | 5/2000 | Abe | 370/228 |
| 6,205,152 B1 | * | 3/2001 | Von Ahnen et al. | 370/419 |
| 6,230,195 B1 | * | 5/2001 | Sugawara et al. | 709/220 |
| 6,256,326 B1 | * | 7/2001 | Kudo | 370/512 |
| 6,370,138 B1 | * | 4/2002 | Kim et al. | 370/353 |
| 6,502,132 B1 | * | 12/2002 | Kumano et al. | 709/224 |

FOREIGN PATENT DOCUMENTS

| | | |
|---|---|---|
| JP | 10-242969 | 9/1998 |
| JP | 10-247910 | 9/1998 |
| JP | 11-225147 | 8/1999 |

\* cited by examiner

*Primary Examiner*—Steven Nguyen
*Assistant Examiner*—M. Phan
(74) *Attorney, Agent, or Firm*—Oblon, Spivak, McClelland, Maier & Neustadt, P.C.

(57) ABSTRACT

In addition to a main monitor/control module, sub-monitor/control modules are provided, which monitor the operating conditions of transmission sections in real time through a CPU bus. The main monitor/control module collects monitor data from each sub-monitor/control module at a given timing through a LAN and processes the monitor data collected.

7 Claims, 16 Drawing Sheets

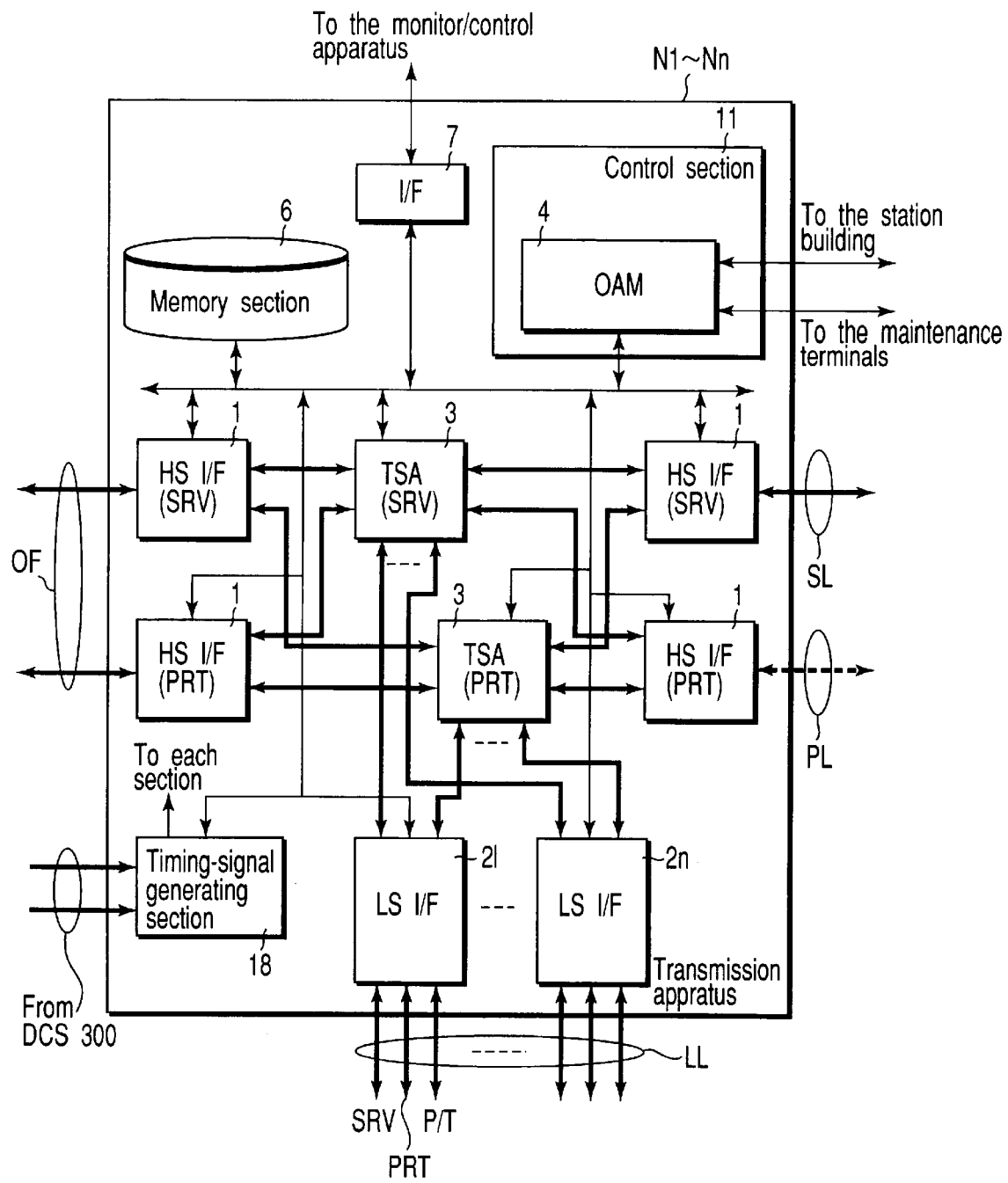
F I G. 2

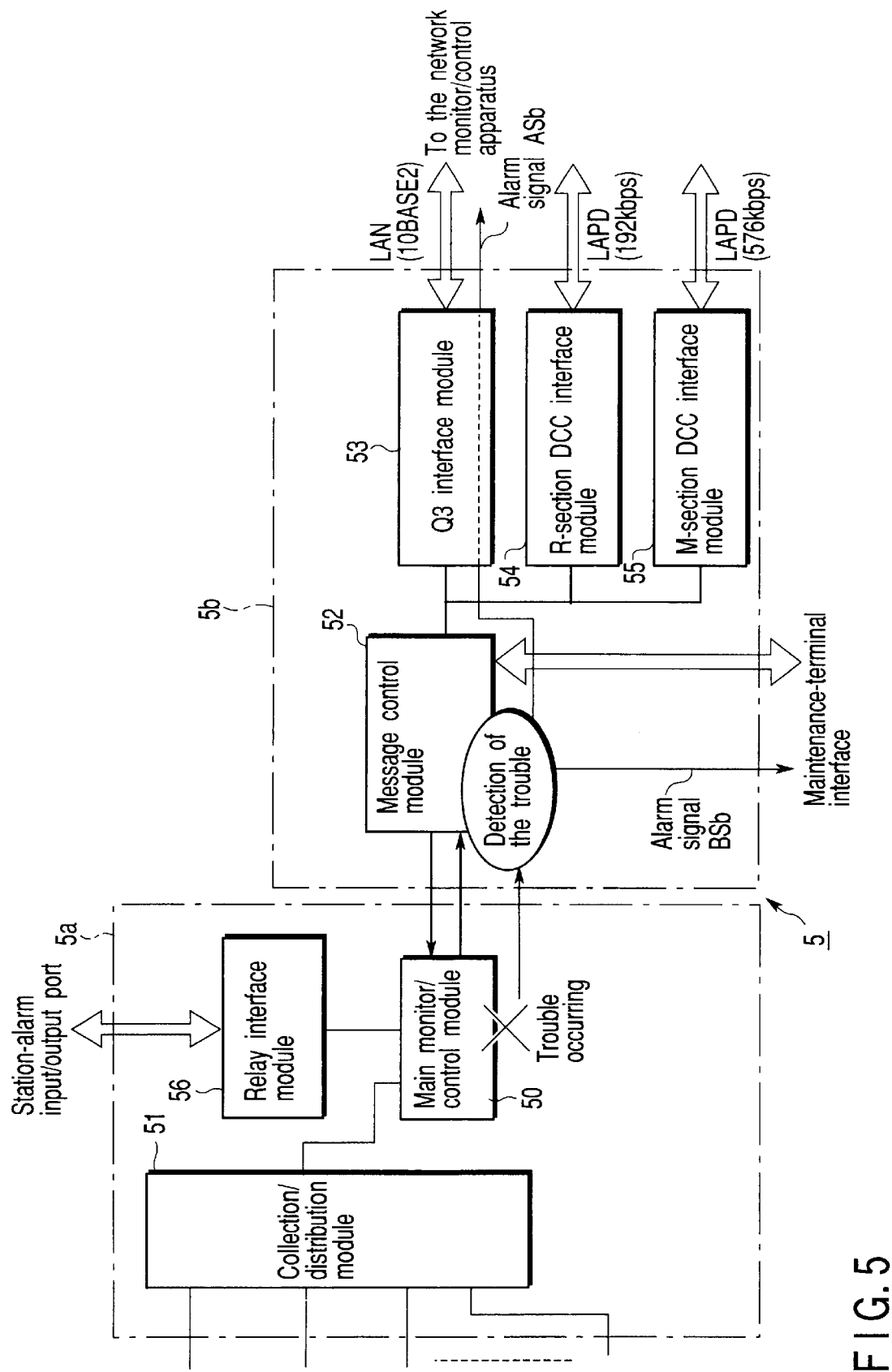
F I G. 5

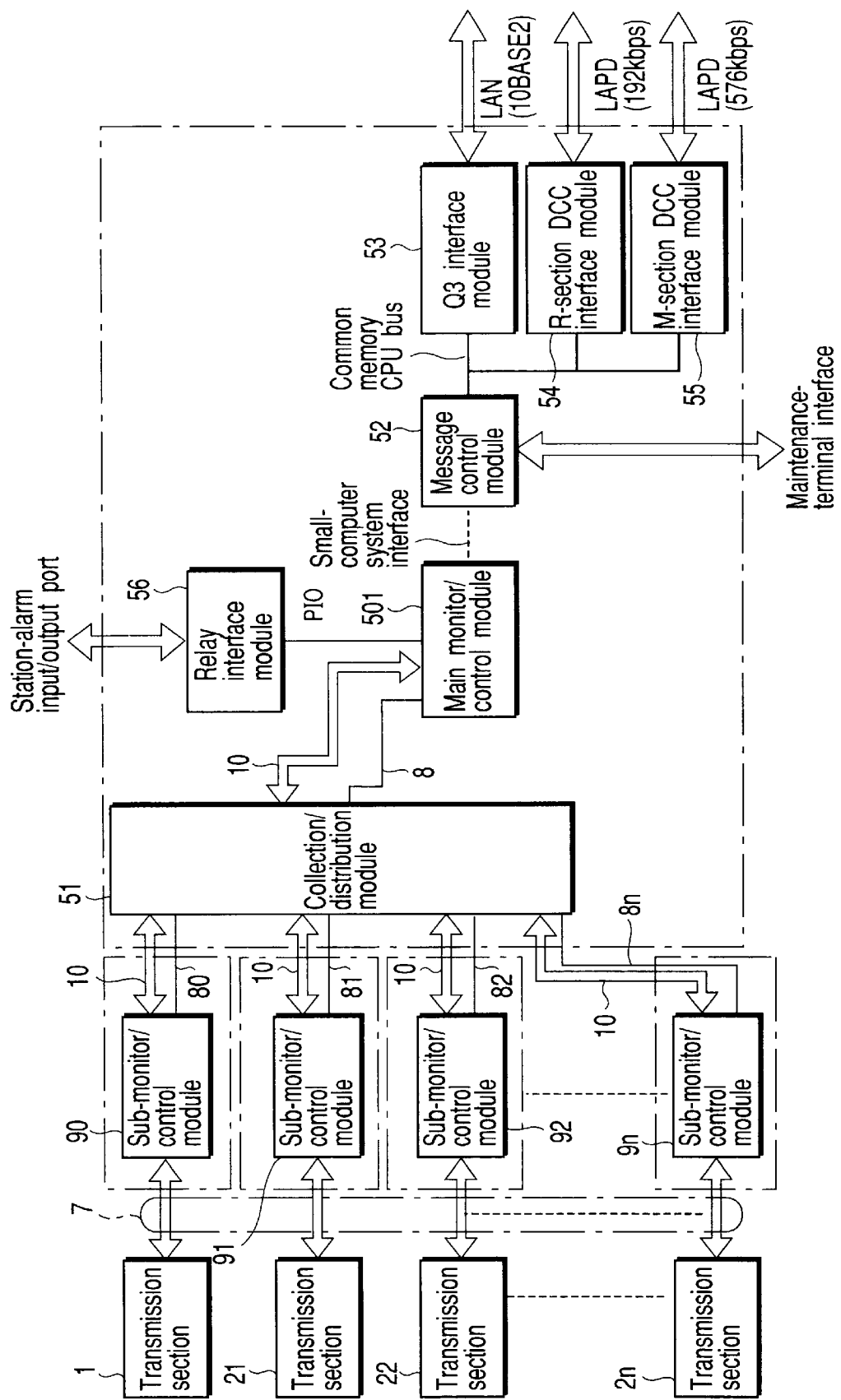
F I G. 6

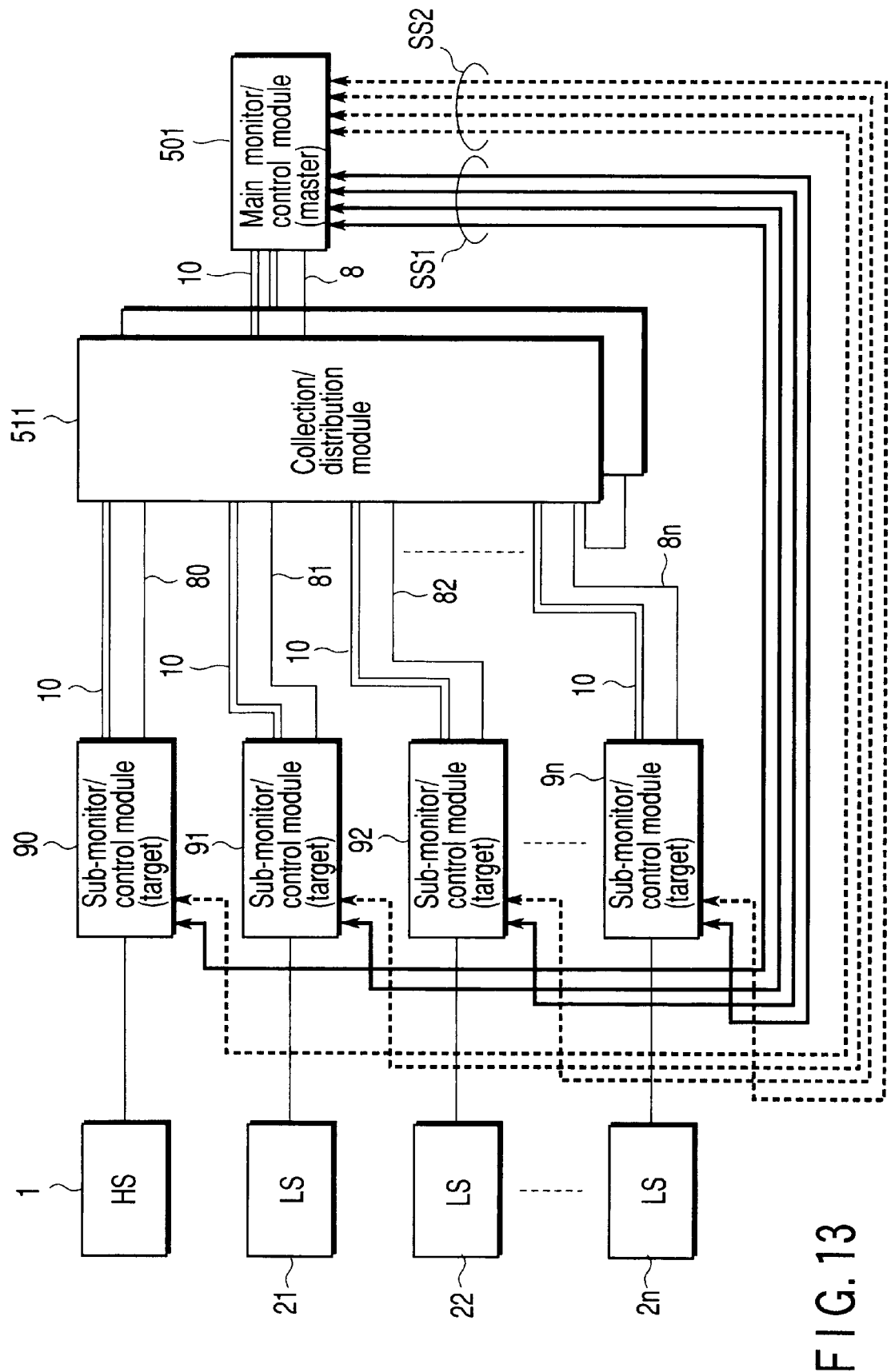
F I G. 13

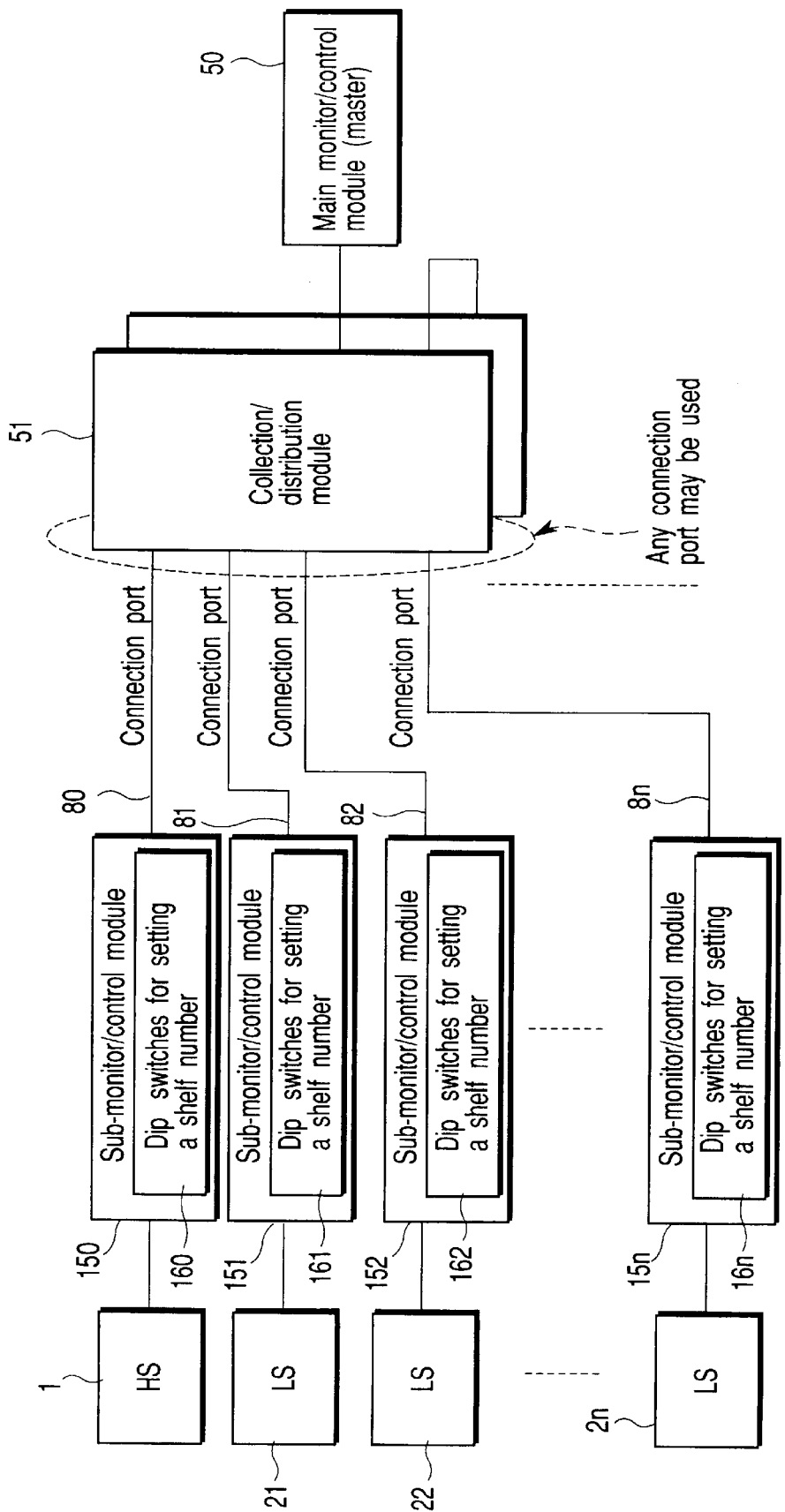
F I G. 15

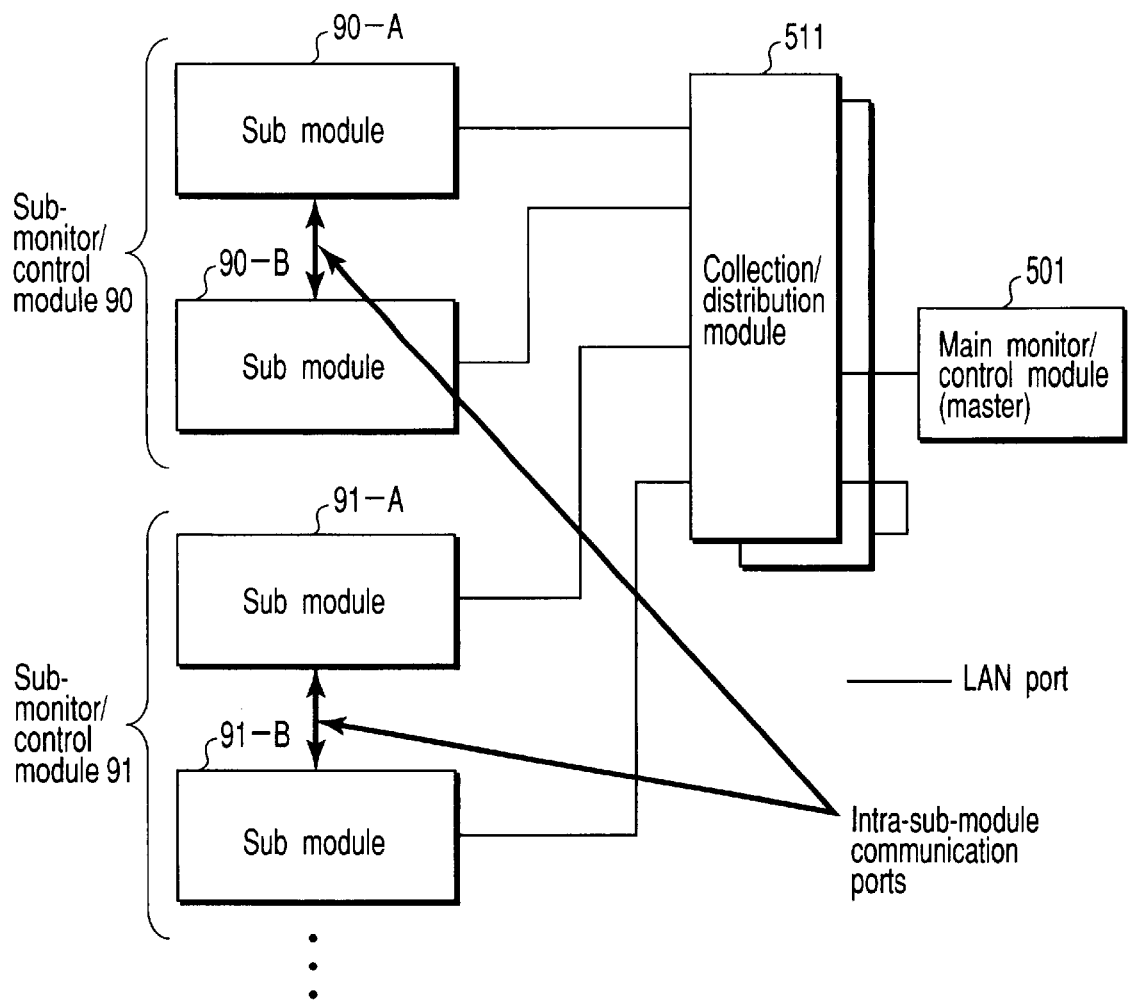
F I G. 16

DIGITAL SIGNAL TRANSMISSION APPARATUS

CROSS REFERENCE TO RELATED APPLICATIONS

This is a Continuation Application of PCT Application No. PCT/JP00/09047, filed Dec. 20, 2000, which was not published under PCT Article 21(2) in English.

This application is based upon and claims the benefit of priority from the prior Japanese Patent Application No. 11-361288, filed Dec. 20, 1999, the entire contents of which are incorporated herein by reference.

BACKGROUND OF THE INVENTION

1. Field of the Invention

The present invention relates to a digital signal transmission apparatus, particularly a digital signal transmission apparatus for use in SDH (Synchronous Digital Hierarchy) or SONET (Synchronous Optical Network). More particularly, the invention relates to an improvement of the OAM (Operation Administration and Maintenance) section incorporated in a digital signal transmission apparatus.

2. Description of the Related Art

SDH attracts attention as a digital transfer system. SDH defines an interface for effectively multiplexing various types of high-speed service and the existing low-speed service. This system is undergoing standardization at the recommendation of ITU-T.

SDH is characterized in that the basic transmission rate is 155.52 Mbps and that signals should be transmitted at an integral multiple of the basic transmission rate, i.e., 155.42×N (N is an integer) Mbps. One frame is 125 $\mu$sec long, which is the basic cycle of encoding audio data, and is multiplexed in units of bytes. The frame configuration is represented by rows and columns of bytes. The frame is composed of an overhead and a payload. The overhead is arranged in the first to ninth columns. The payload is arranged in the tenth column and the remaining columns and contains main data.

The overhead consists of a section overhead (SOH), an Administrative Unit pointer (AU PTR), and a pass overhead (POH). SOH contains network management data that is used to transmit the main data. It performs various functions, such as frame synchronization, error monitoring, alarm transfer, data linking for operation administration and maintenance, system switching control, and the like. AU PTR designates the head position of the multiplexed data stored in the payload. POH has the function of transferring error alarms.

An SDN transmission apparatus comprises an OAM section for the operation administration and maintenance of the apparatus, in addition to a plurality of transmission units. The OAM section has various management/control functions, ranging from intra-apparatus management to systematic operation administration and maintenance. The intra-apparatus management includes as control of the apparatus, such as switching the apparatus now used to a reserve one, monitoring of transmission quality, failure evaluation. The systematic operation administration and maintenance includes control of transmission line installation and operation administration of the network. To perform these functions, the OAM section needs to have not only an input/output interface for the intra-apparatus modules such as transmission units, but also an input/output interface for the management data transmitted between the apparatus and an external supervisory apparatus by the use of overheads.

Generally, the OAM section of the conventional transmission apparatus has a monitor/control module equipped with a high-performance CPU. The monitor/control module carries out all functions of the OAM section. The monitor/control module of the conventional transmission apparatus therefore needs to have a large-capacity transmission port. Inevitably, the conventional transmission apparatus has a complex and gigantic structure.

Further, the monitor/control module of the conventional transmission apparatus must operate at high speeds. Its operating efficiency may decrease when the control traffic is busy due to many alarms generated. To make the matter worse, the conventional transmission apparatus has but insufficient countermeasures against troubles the monitor/control module may have.

BRIEF SUMMARY OF THE INVENTION

An object of the present invention is to provide a digital signal transmission apparatus in which the control traffic concerning the operation administration and maintenance does not become busy and which can therefore be simple in structure and operate with high reliability.

To achieve the object, a digital signal transmission apparatus according to the invention has a plurality of transmission units each including a line connection unit. The transmission units transmit and receive multiplexed digital signals to and from an external transmission apparatus. The digital signal transmission apparatus comprises:

a first transmission line having a first transmission speed and a second transmission line having a second transmission speed lower than the first transmission speed;

first monitor/control units connected by the first transmission line to the plurality of transmission units, respectively, for monitoring operating condition of each transmission unit in real-time and through the first transmission line; and a second monitor/control unit connected to the first monitor/control units by the second transmission line, for collecting monitor data concerning each transmission unit and acquired by the first monitor/control units, in real time through the second transmission line, and for monitoring the apparatus on the basis of the monitor data concerning each transmission unit and acquired by the first monitor/control units.

In the present invention, the first monitor/control units monitor the transmission units for their operating conditions, and the second monitor/control unit monitor the entire apparatus on the basis of the data representing the conditions the first monitor/control units have monitored. Thus, even the transmission units are provide in large numbers, the operation conditions of the transmission units can be monitored in real time and more reliably than in the case where a single main monitor/control module perform all controls concerning the monitoring of the transmission lines. No communication ports of large capacity need to be provided in the main monitor/control units. Nor is it necessary to perform processes at high speeds in the main monitor/control units. Thus, monitoring and control can be efficiently carried out by means of a general-purpose configuration.

The first monitor/control units are provided for the transmission units, respectively. Therefore, if any first monitor/control unit malfunctions or has a trouble, the other monitor/control units keep operating. This enhances the reliability of the apparatus.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a block diagram schematically depicting one of the SDH transmission apparatuses, i.e., the digital transmission apparatus according to the first embodiment of the invention;

FIG. 5 is a circuit-block diagram illustrating the structures and operations of the main components of the operation administration and maintenance device that is incorporated in the second embodiment of this invention;

FIG. 6 is a circuit-block diagram showing the structure of the operation administration and maintenance device that is incorporated in the third embodiment of this invention;

FIG. 13 is a circuit-block diagram showing the structures of the operation administration and maintenance device that is incorporated in the sixth embodiment of the invention;

FIG. 15 is a circuit-block diagram showing the structures of the operation administration and maintenance device that is incorporated in the eighth embodiment of the invention; and FIG. 16 is a circuit-block diagram showing the structures of the operation administration and maintenance device that is incorporated in the ninth embodiment of the present invention.

DETAILED DESCRIPTION OF THE INVENTION

The embodiments of this invention will be described in detail, with reference to the accompanying drawings.

First Embodiment

Figure 1:
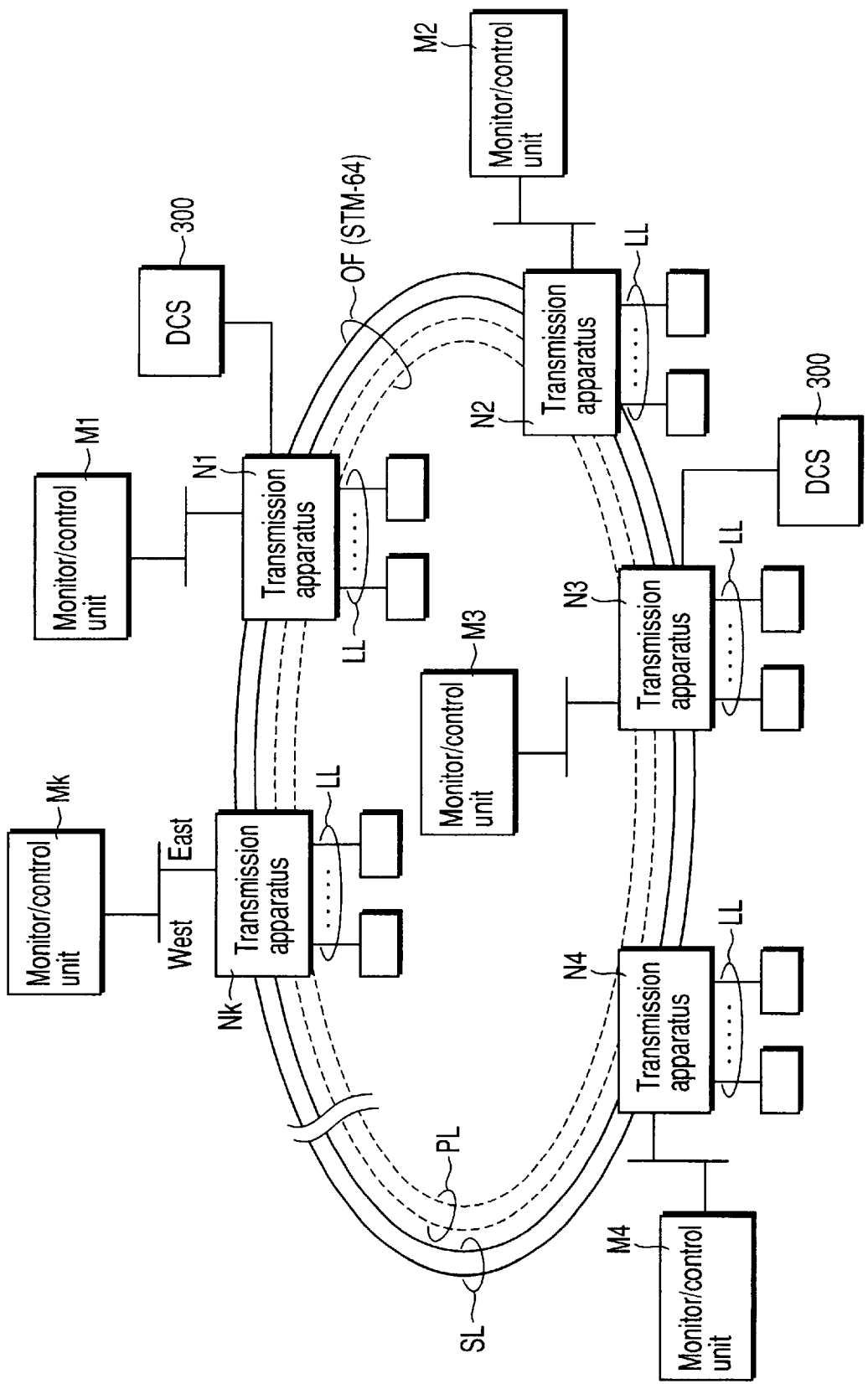
FIG. 1 is a system diagram showing a transmission system having SDH transmission apparatuses, or digital transmission apparatuses that is the first embodiment according to the present invention.

FIG. 1 is a system diagram showing a transmission system having SDH transmission apparatuses, or digital transmission apparatuses that are the first embodiment of the present invention. The system comprises n transmission apparatuses N1 to Nk connected by a line cable OF, constituting a ring. The line cable OF has a transmission capacity of STM-64 (Synchronous Transfer Module-Level 64) defined by the SDH.

The line cable OF comprises a service line SL and a protection line PL. The lines SL and PL have a clockwise (CW) channel and a counterclockwise (CCW) channel each.

The transmission apparatuses N1 to Nk drop predetermines ones of the time slots time-divided into STM-64 frames to be transmitted through the line cable OF. The slots dropped are transmitted, as lower-order signals, through tributary lines LL to tributary lower-order apparatuses (not identified by reference symbols) such as switchboards and terminal stations.

The transmission apparatuses N1 to Nk multiplexes lower-order signals, such as STM-1, STM-4, STM-16 and STM-64, on prescribed slots. Note that the lower-order signals have been sent from the lower-order apparatuses via the tributary lines LL. The signals, thus multiplexed, are transmitted to other transmission apparatuses. Transmission paths of a predetermined transmission capacity are thereby provided between the transmission apparatuses N1 to Nk.

The system of FIG. 1 further comprises a plurality of monitor/control apparatuses M1 to Mk. The monitor/control apparatuses M1 to Mk are connected by LANs (Local Area Networks) to the transmission apparatuses N1 to Nk, respectively. The monitor/control apparatuses M1 to Mk perform various controls, such as path setting and alarm monitoring in the network, in accordance with the information supplied to them. The apparatuses M1 to Mk performs such functions in accordance with the dedicated application software installed in, for example, general-purpose workstations.

The system shown in FIG. 1 has a plurality of digital clock supplies (DCSs) 300 that supply working clock signals for the network. The transmission apparatuses N1 to Nk receive an operating clock signal from any one of the clock supplies 300 and operate in synchronization with the operating clock signal. If troubles occur in the clock supply 300, the transmission apparatuses N1 to Nk will receive an operation clock signal from any other clock supply 300.

Figure 3:
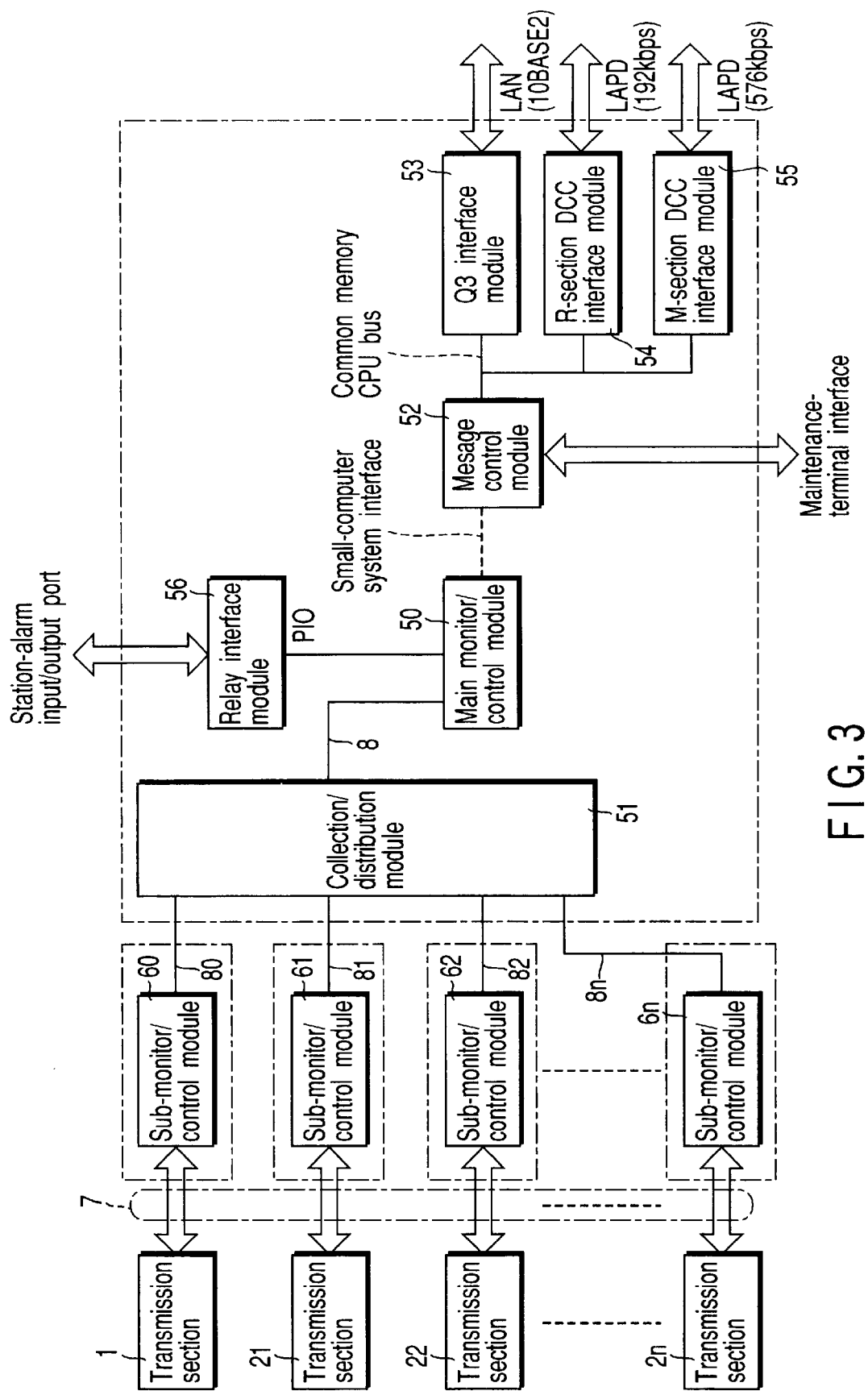
FIG. 3 is a circuit-block diagram illustrating the operation administration and maintenance device that is incorporated in the SDH transmission apparatus shown in FIG. 2.

FIG. 2 is a diagram schematically depicting one of the SDH transmission apparatuses N1 to Nk that are identical in structure. In FIG. 3, reference numeral 1 denotes line interface sections (HS I/F). Two line interface sections 1 are provided, i.e., service line interface section HS I/F (SRV) and protection line interface section HS I/F (PRT). The service line interface section HS I/F (SRV) is connected to the service line SL. The protection line interface section HS I/F (PRT) is connected to the protection line PL.

The signal STM-64 supplied into the apparatus via the line interface section 1 is input to a time slot assignment (TSA) section 3. The time slot assignment section 3 drops a prescribed one of time-divided, multiplexed time slots to the signal STM-64. The slot thus dropped is supplied to the tributary line LL through tributary interface sections (LS I/F) 21 to 2n. It is then transmitted through the tributary line LL as a lower-order signal. A lower-order signal supplied into the apparatus from the tributary line LL via the tributary interface sections (LS I/F) 21 to 2n is given to the time slot assignment section 3. This lower-order signal is added to the prescribed time slot of an STM-64 frame and transmitted to another transmission apparatus through the line cable OF.

The time slot assignment section 3 is a dual unit, comprising a service system TSA (SRV) and a protection system TSA (PRT). If the time slot assignment section TSA (SRV) has a trouble, the time slot assignment section TSA (PRT) will operate instead. Thus, apparatus redundancy is achieved.

In normal operation, the time slot assignment section TSA (PRT) serves in part time traffic (P/T). The part time traffic is transmission of signals that convey data different from the data transmitted in the service traffic in the service system. Usually, the part time traffic is used as one having lower priority than the service traffic.

Each of the transmission apparatus N1 to Nk, which is shown in FIG. 2, further comprises a control section 11, a memory section 6, a management network interface (I/F) 7, and a timing-signal generating section 18. The memory section 6 stores various control programs and the like. The management network interface 7 transfers data between the monitor/control apparatuses M1 to Mk. The timing-signal generating section 18 supplies an operating clock signal to the other devices incorporated in the apparatus. The control section 11 has an operation administration and maintenance (OAM) device 4.

The operation administration and maintenance device 4 performs all controls concerning the operation, management and maintenance of the SDH transmission apparatus. FIG. 3 is a circuit-block diagram illustrating the operation administration and maintenance device 4.

The operation administration and maintenance device 4 comprises a main body 5 and a plurality of sub-monitor/control modules 60 to 6n. The main body 5 contains a main monitor/control module 50. The sub-monitor/control modules 60 to 6n are provided for the high-speed signal transmission section 1 and the low-speed signal transmission sections 21 to 2n, in one-to-one relation. A sub-monitor/control module (not shown) is provided for the line-connecting section 3, too.

Each of the sub-monitor/control modules 60 to 6n has a bus interface in addition to control devices such as a CPU. A CPU bus 7 connects the bus interfaces to the high-speed signal transmission section 1 and the low-speed signal transmission sections 21 to 2n. The bus interfaces monitor the operations of the high-speed signal transmission section 1 and the low-speed signal transmission sections 21 to 2n, in real time and through the CPU bus 7. The sub-monitor/control modules 60 to 6n have an LAN interface each and are connected to a collection/distribution module (HUB) 51 (later described) by LAN transmission lines 80 to 8n. The sub-monitor/control modules 60 to 6n transmit the data representing the operations of the high-speed signal transmission section 1 and low-speed signal transmission sections 21 to 2n to the main body 5 through the LAN transmission lines 80 to 8n.

The main body 5 comprises the collection/distribution module 51, in addition to the main monitor/control module 50. The collection/distribution module 51 functions as the center node of the LAN. It transfers the monitor data items generated by the sub-monitor/control modules 60 to 6n, respectively to the main monitor/control module 50 through the LAN. The main monitor/control module 50 collects the monitor data items about the transmission sections 1 and 21 to 2n, through the LAN from the sub-monitor/control modules 60 to 6n. The module 50 performs processes necessary for the operation of the apparatus, such as monitoring of the components of the apparatus and the transmission quality, generation of alarms, and switching between the apparatus now used to a reserve one. The LAN may be, for example, the Ethernet (10BASE-T).

The main body 5 incorporates a relay interface module 56, besides the main monitor/control module 50. PIO (Parallel Input Output) connects the relay interface module 56 to the main monitor/control module 50. The module 56 generates a relay-contact signal in accordance with the instructions of the main monitor/control module 50. The relay-contact signal is supplied to the display panel that is provided in a station building (not shown).

The main body 5 further comprises a message control module 52 and three external interface modules 53, 54 and 55, besides the main monitor/control module 50. The message control module 52 and the three external interface modules 53, 54 and 55 perform protocol-processing function, message-converting function and the like to transmit and receive monitor data to and from external apparatuses such as external supervisory apparatuses, while the main monitor/control module 50 controls the operation, administration and maintenance in the apparatus.

The message control module 52 is connected to the main monitor/control module 50 by a small-computer system interface (SCSI) bus. The module 52 outputs monitor data, such as alarm data, to maintenance terminals (not shown) by itself or in accordance with instructions given by the main monitor/control module 50. If necessary, the module 52 outputs the monitor data such as alarm data to the external monitor/control apparatuses through the Q3 interface modules 53, which will be described later.

More specifically, the external interface modules 53, 54 and 55 are a Q3 interface module (Q INF), an R-section DCC interface module (ECC R), and an M-section DCC interface module (ECC M), respectively. The external interface modules 53, 54 and 55 are connected to the message control module 52 by a common memory CPU bus (VME bus).

The Q INF 53 controls the malfunction, transmission quality and the like of the operation administration and maintenance device 4. It transmits and receives monitor data such as alarms, to and from the external supervisory apparatuses (not shown) through the LAN (10BASE2). The ECC R 54 transmits and receives through LAPD (192 Kbps) the data about the overhead relayed between the SDH apparatuses of the system. The ECC M55 transmits and receives through LAPD (576 Kbps) the data about the overhead transmitted between the SDH apparatuses and the terminal stations.

The operation administration and maintenance device 4 has the structure described above. Hence, the sub-monitor/control modules 60 to 6n provided, in one-to-one relation, for the high-speed signal transmission section 1 and low-speed signal transmission sections 21 to 2n monitor the operations of the signal transmission sections 1 and 21 to 2n in real time. They reliably detects, in real time, a malfunction, if any, in the high-speed signal transmission section 1 and low-speed signal transmission sections 21 to 2n. The operating conditions of the many transmission section 1 and 21 to 2n can be reliably and fast detected.

The sub-monitor/control modules 60 to 6n operate independently. Thus, the monitoring of each transmission section does not influence the monitoring of any other transmission section even if malfunction takes place in any one of the sub-monitor/control modules 60 to 6n. The transmission sections 1 and 21 to 2n can therefore be monitored with high reliability.

On the other hand, the main monitor/control module 50 collect via a LAN 8 and processes in time-division the monitor data items about the transmission sections 1 and 21 to 2n, which have been acquired in the sub-monitor/control modules 60 to 6n. The main monitor/control module 50 can therefore collect and process the monitor data items at a relatively low speed, though many transmission sections (1 and 21 to 2n) are provided.

The main monitor/control module 50 can therefore reliably monitor the operation of the numerous transmission sections 1 and 21 to 2n and can achieve remedy, if necessary, for them, without the necessity of processing data at high speeds. Further, the main monitor/control module 50 does not need to have many communication ports for the transmission sections 1 and 21 to 2n. The wiring configuration is more simple than otherwise. This helps prevent a decrease in the performance of the main monitor/control module 50.

If an operation trouble occurs in the apparatus, the main monitor/control module 50 gives a display drive instruction via the PIO to the relay interface module 56. Upon receipt of the instruction the relay interface module 56 generates a relay-contact signal, which is supplied to the display panel provided in the station building. The signal turns on a lamp provided on the display panel. The module 56 generates the relay contact signal, independently of the other modules incorporated in the apparatus. This prevents erroneous generation of a relay contact signal from noise or the like. Thus, the display panel can display the operating condition of the apparatus with high reliability.

If an operation trouble develops in the apparatus, the data indicating this fact is supplied via the SCSI bus to the message control module 52. The message control module 52 generates an alarm, which is supplied to the maintenance terminals. The message control module 52 can reliably supply monitor data such as an alarm to the maintenance terminals and receive operation data from the maintenance terminals, not directly relying on the main monitor/control module 50, as in the process of monitoring the transmission sections 1 and 21 to 2n.

The external interface modules 53, 54 and 55 operate independently. The module 53 transmits monitor data to, and receives it from, the external supervisory apparatuses. The module 54 transmits and receives overhead data in the relay section. The module 55 transmits and receives overhead data in the terminal section. The modules 53, 54 and 55 can reliably transmit and receive monitor data and overhead data to and from the external supervisory apparatuses, not relaying on the main monitor/control module 50, and can, as in the same way as monitoring the transmission sections 1 and 21 to 2n and transmitting and receiving data to and from the maintenance terminals.

Hence, the main monitor/control module 50 need not have a connection port in order to transmit and receive data to and from the maintenance terminals or the external supervisory apparatuses. The wiring provided around the main monitor/control module 50 is more simple than otherwise.

Additionally, the main monitor/control module 50 need not have the function of performing external interface processes. The working load on the main monitor/control module 50 is therefore smaller than otherwise. Moreover, even if an operation trouble occurs in any one of the message control module 52 and external interface modules 53 to 55, it will not influence any other module. This is because the message control module 52 and external interface modules 53 to 55 operate independently of one another. The external interface processes can therefore be performed with high reliability, too.

In the first embodiment, the message control module 52 connects the external interface modules 53, 54 and 55 to the main monitor/control module 50. Alternatively, the external interface modules 53, 54 and 55 may be directly connected to the main monitor/control module 50.

Second Embodiment

The second embodiment of the invention is a system in which the main monitor/control module and the message control module monitor each other for their operating conditions, each generating an alarm upon detecting a malfunction of the other. Note that the main monitor/control module controls the operation, administration and maintenance in the apparatus, whereas the message control module controls the transmission and receipt of monitor data and overhead data to and from the external apparatuses.

Figure 4:
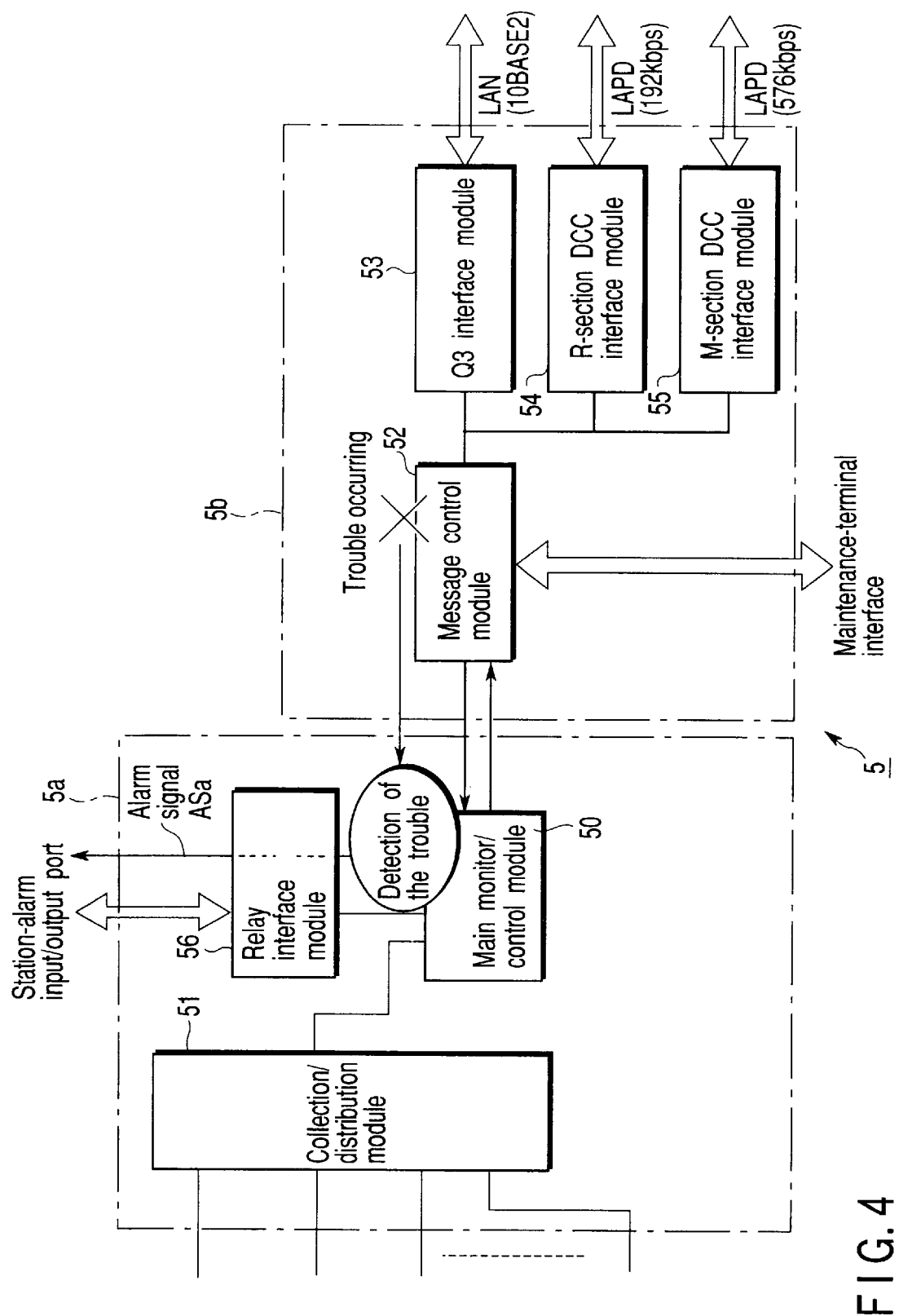
FIG. 4 is a circuit-block diagram illustrating the structures and operations of the main components of the operation administration and maintenance device that is incorporated in the second embodiment of this invention.

FIGS. 4 and 5 are circuit-block diagrams illustrating the structures and operations of the main components. The operation administration and maintenance device 4 is the same as that (FIG. 3) of the first embodiment described above, and will not be shown or described in its entirety.

The main body 5 is divided into an intra-apparatus monitor/control section 5a and an external interface section 5b, in terms of function. The intra-apparatus monitor/control section 5a incorporates a main monitor/control module 50, a collection/distribution module 51, and a relay interface module 56. On the other hand, the external interface section 5b incorporates a message control module 52, a Q3 interface module (Q INF) 53, an R-section DCC interface module (ECC R) 54, and an M-section DC interface module (ECC M) 55.

The main monitor/control module 50 of the intra-apparatus monitor/control section 5a comprises monitor means and alarm means. The monitor means monitors, via an SCSI bus, the operation of the message control module 52. The alarm means causes the relay interface module 56 to generate an alarm signal ASa, when the monitor means detects an operation trouble in the module 52. The signal ASa is supplied to a display panel (not shown), which displays the alarm.

The message control module 52 of the external interface section 5b comprises monitor means and alarm means. The monitor means monitors, via the SCSI bus, the operation of the main monitor/control module 50. The alarm means performs two functions. First, it supplies an alarm signal BSb to the maintenance terminals (not shown) when the monitor means detects an operation trouble in the main monitor/control means. Second, it supplies a similar signal ASb via the Q INF 53 to the maintenance terminals (not shown).

Assume that an operation trouble, such as the runaway of the CPU, occurs in the message control module 52. This trouble is detected when the main monitor/control module 50 determines that the message control module 52 has made no responses for a prescribed time. Upon detecting the trouble, the main monitor/control module 50 instructs the relay interface module 56 to generate an alarm that indicates the trouble in the message control module 52. Upon receipt of the alarm, the relay interface module 50 generates an alarm signal ASa showing the operation trouble. The alarm signal ASa is supplied to the display panel. The display panel displays a message showing that a trouble has occurred in the message control module 52.

Assume that an operation trouble, such as the runaway of the CPU, develops in the main monitor/control module 50. This trouble is detected when the message control module 52 determines that the main monitor/control module 50 has made no responses for a prescribed time. Then, the message control module 52 generates an alarm signal BSb that indicates the trouble in the main monitor/control module 50. The signal BSb is supplied to the maintenance terminals, which display a message informing that the trouble has occurred in the main monitor/control module 50. At the same time, the module 52 generates an alarm signal ASb indicating the trouble in the main monitor/control module 50. This signal ASb is supplied through the Q INF 53 to the external monitor/control apparatuses, informing the external monitor/control apparatuses of the operation trouble occurring in the main monitor/control module 50.

Thus, the main monitor/control module 50 and the message control module 52 monitor each other for any operation trouble, in the second embodiment. An operation trouble, if any in the main monitor/control module 50 and the message control module 52, can therefore be reliably detected. The signal indicating the trouble can be supplied from the apparatus. The reliability of the apparatus can increase. In addition, there is no need to use a reserve main monitor/control module or a reserve message control module. That is, the components of the apparatus are effectively utilized. The apparatus can therefore be small, and its manufacturing cost can be low.

In the second embodiment, the main monitor/control module 50 and the message control module 52 monitor each other for their operating conditions. Nonetheless, not only the main monitor/control module 50 and the message control module 52, but also the external interface modules 53, 54 and 55, all connected to the modules 50 and 52, may monitor one another for operating conditions. Further, the message control module 52 may monitor not only the operating condition of the main monitor/control module 50, but also the operating condition of the relay interface module 56.

Third Embodiment

In the third embodiment of this invention, a star-type LAN and a serial input/output bus connect the sub-monitor/control modules provided for the transmission sections, respectively, to the main monitor/control module. Of the monitor data items the sub-monitor/control modules have acquired, those that are not immediately necessary are transferred to the main monitor/control module though the LAN. By contrast, the monitor data items that are immediately necessary are transferred to the main monitor/control module via the serial input/output bus.

FIG. 6 is a circuit-block diagram showing the structure of the operation administration and maintenance device that is incorporated in the third embodiment. The components identical to those shown in FIG. 3 are designated at the same reference numerals and will not be described in detail.

The sub-monitor/control modules 90 to 9n are connected to a collection/distribution module 511 by LAN transmission lines 80 to 8n and serial input/output buses 10. The collection/distribution module 511 is connected to the main monitor/control module 501 by a LAN transmission line 8 and a serial input/output bus 10. The collection/distribution module 511 functions as a center node for collecting and distributing data through the LAN transmission lines 8 and 80 to 8n and as a center node for collecting and distributing data through the serial input/output buses 10.

Figure 7:
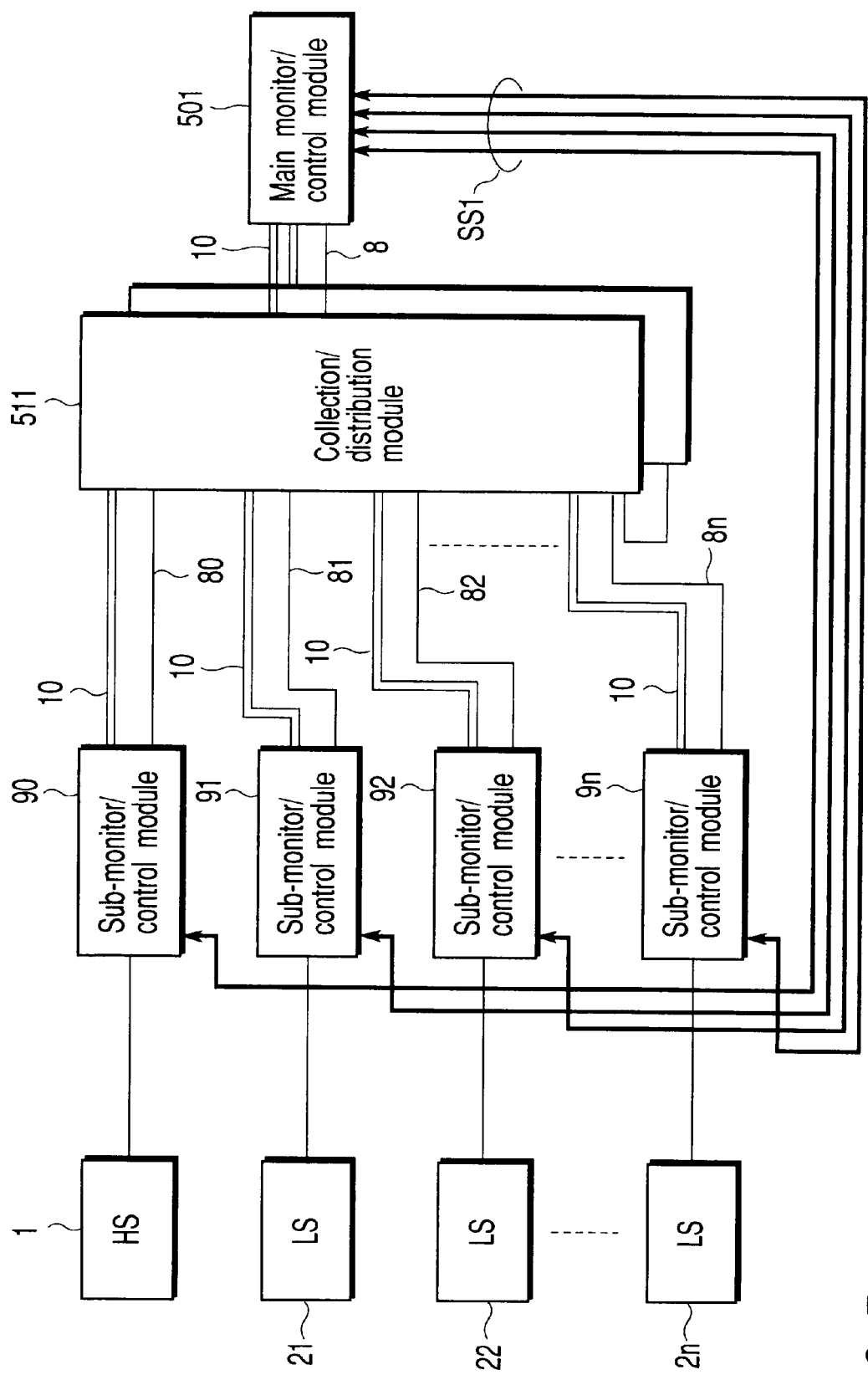
FIG. 7 is a circuit-block diagram showing the main components of the operation administration and maintenance device shown in FIG. 6.

FIG. 7 illustrates the star-type LAN and the star-type serial input/output buses in more detail. As FIG. 7 shows, serial input/output control lines (SIO control lines) SS1 connect the main monitor/control module 501 to the sub-monitor/control modules 90 to 9n. The SIO control lines SS1 are used to control the data transfer through the serial input/output buses 10. The SIO control lines SS1 control the transfer of the communication protocol and the like.

The sub-monitor/control modules 90 to 9n monitor the signal transmission sections 1 and 21 to 2n, respectively, thereby acquiring monitor data items that represent the operating conditions of the sections 1 and 21 to 2n. Each sub-monitor/control module performs two functions. First, it classifies the monitor data as high-emergency one showing the deterioration of transmission quality, accompanied by a malfunction or line switching in the signal-transmitting section, or as low-emergency one indicating the quality of the transmission lines. Second, it supplies the high-emergency monitor data to the main monitor/control module 501 via the serial input/output bus 10 and the low-emergency monitor data to the main monitor/control module 501 via one of the LAN transmission lines 80 to 8n.

When the main monitor/control module 501 receives high-emergency monitor data through the serial input/output bus 10, it analyzes the monitor data in real time and performs an appropriate process on the monitor data. When it receives monitor data through the LAN transmission line 8, it temporarily stores the data and then outputs the same at a given timing.

Thus, the monitor data showing the quality of the signal transmission sections, detected in the sub-monitor/control modules 90 to 9n, is classified as low-emergency monitor data. The monitor data is then transferred via the LAN transmission lines 80 to 8n to the main monitor/control module 501. The main monitor/control module 501 processes this monitor data in batch at a given timing. The main monitor/control module 501 can therefore efficiently process the monitor data items about the signal transmission sections 1 and 21 to 2n, without the necessity of processing data at high speeds.

A malfunction may be detected in any signal transmission section, such as the deterioration of transmission quality, accompanied by line switching, which should be eliminated immediately. In this case, the monitor data representing this malfunction is classified as high-emergency monitor data and is transferred via the serial input/output bus to the main monitor/control module 501. The main monitor/control module 501 processes the monitor data in real time. That is, any high-emergency monitor data acquired, which shows the deterioration of transmission quality or the like, resulting from a malfunction or line switching in any signal transmission section, is transferred to the main monitor/control module 501 at high speeds. The module 501 processes the data in real time. The trouble that should be immediately eliminated can be fast and appropriately solved, not influenced by a bottleneck in the transmission line, such as data collision or data re-transmission in the LAN.

The collection/distribution module 511 contains the center node of the LAN and the center node of the serial input/output bus. The wiring configuration of the apparatus is therefore simpler than in the case where the LAN and the serial input/output bus are arranged separately.

Fourth Embodiment

The fourth embodiment of the invention is concerned with a specific method in which the SIO control lines SS1 control the data transfer though the serial input/output buses 10.

Figure 8:
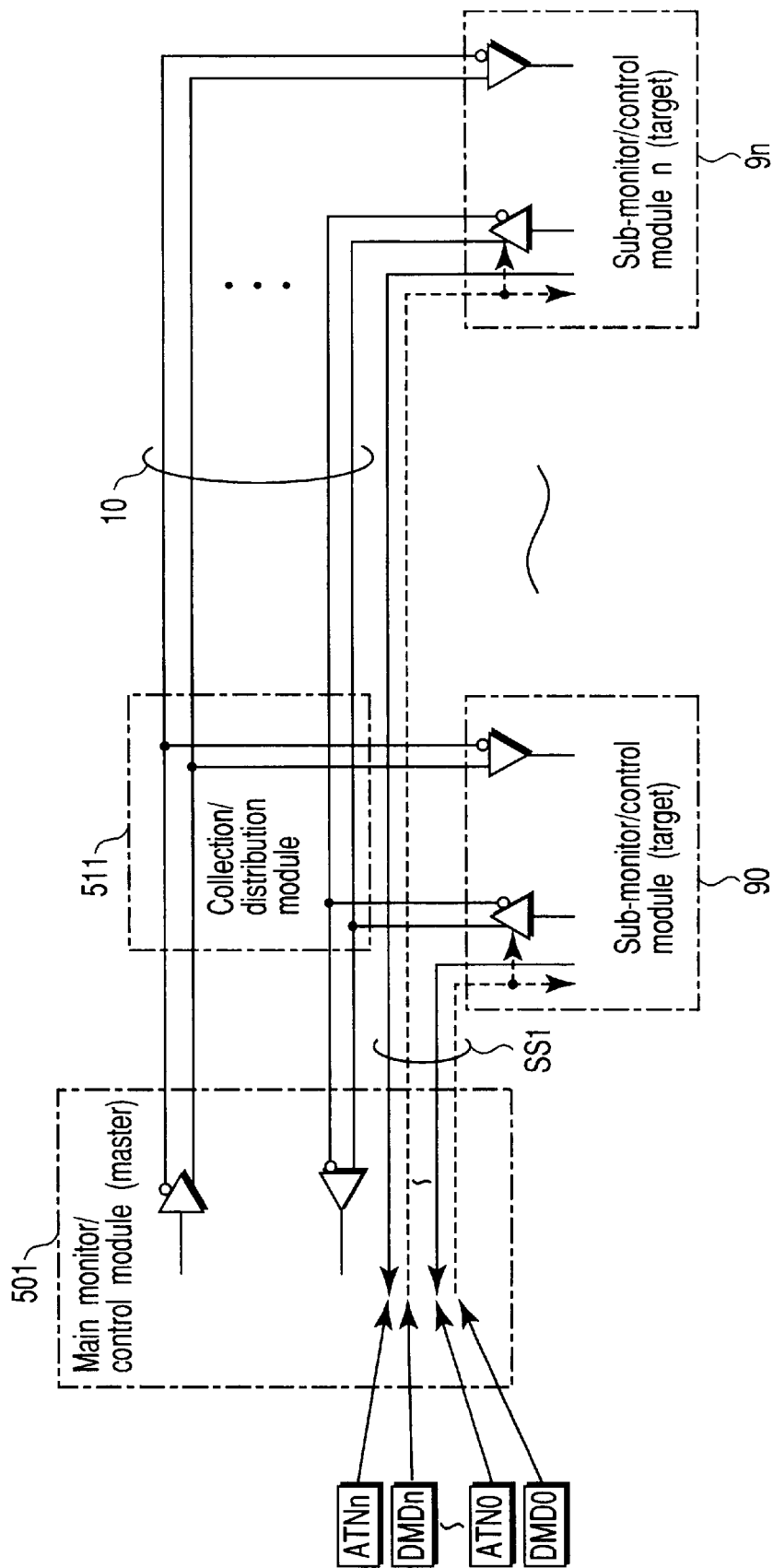
FIG. 8 is a diagram showing the serial input/output buses 10 and SIO control lines SS1, which are incorporated in the fourth embodiment of the present invention.

FIG. 8 is a diagram showing the serial input/output buses 10 and SIO control lines SS1, which are incorporated in the fourth embodiment. In FIG. 8, the main monitor/control module 501 is called "master," and the sub-monitor/control modules 90 to 9n are named "targets."

As FIG. 8 shows, each serial input/output bus 10 comprises two transmission lines. The first line transfers data from the master to the targets. The second line transfers data from the targets to the master. Each of the signal lines forming the serial input/output bus 10 is composed of two transfer lines that transfer two signals of the opposite phases, respectively. The resistance to noise is thereby enhanced. The signal line may be composed of only one transfer line, depending upon the noise resistance desired.

The SIO control lines SS1 connects the master to the targets, respectively. Each line SS1 is composed of two control lines. The first control line is an ATN (Attention) control line (ATN0, ATN1, . . . or ATNn). The first control line transfers a data-transfer request for data transfer from the target to the master. The second control line is a DMD (Demand) control line (DMD0, DMD1, . . . or DMDn). The DMD control line transfers data permitting the data transfer from the master to the target. Hence, the ATN control line is an input line for the master and an output line for the target, whereas the DMD control line is an output line for the master and an input line for the target. The master and each target are connected in one-to-one relation, by the above-mentioned two types of control lines. When the DMD control line is active, the transmission port of the target is opened.

Figure 9:
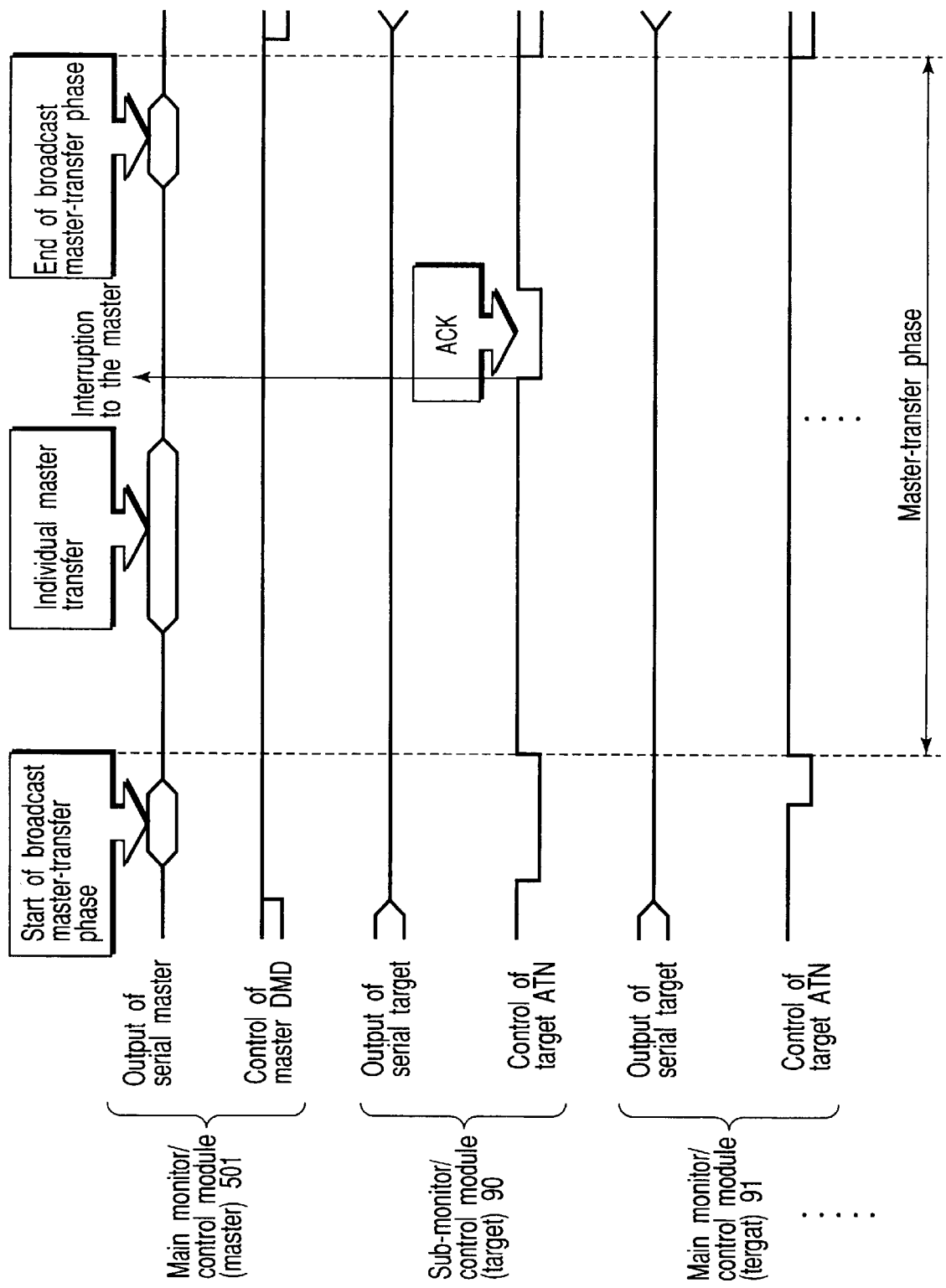
FIG. 9 is a chart illustrating the transmission sequence of transferring data from the master to a target in the structure shown in FIG. 8.

FIG. 9 is a chart illustrating the transmission sequence of transferring data from the master to a target in the structure shown in FIG. 8. As shown in FIG. 9, the master receives data transferred from any target and then broadcast to each target the data instructing that the master-transfer phase be started. Upon receipt of this data, each target cancels the data-transfer request and renders the ATN control line disabled (or inactive).

The master monitors the SIO control lines SS1 for their conditions. After the master determines that the ATN control lines of all targets are disabled, it transfers data to any one of the targets (individual master transfer). The data transferred to the target during the individual master transfer contains the address of the destination target. In the case of FIG. 9, the destination target is the sub-monitor/control module 90.

When the sub-monitor/control module 90 finishes receiving the data from the master, it transmits via the ANT control line the data showing this fact. In other words, the module 90 uses the ATN signal line to transmit an ACK (Acknowledge) to the master.

The master, which has received the ACK, broadcasts to the target the data instructing that the master-transfer phase be terminated. Upon receipt of this data, the target starts transmitting the data-transfer request again, which had been transmitted to the master before the master-transfer phase was initiated.

Figure 10:
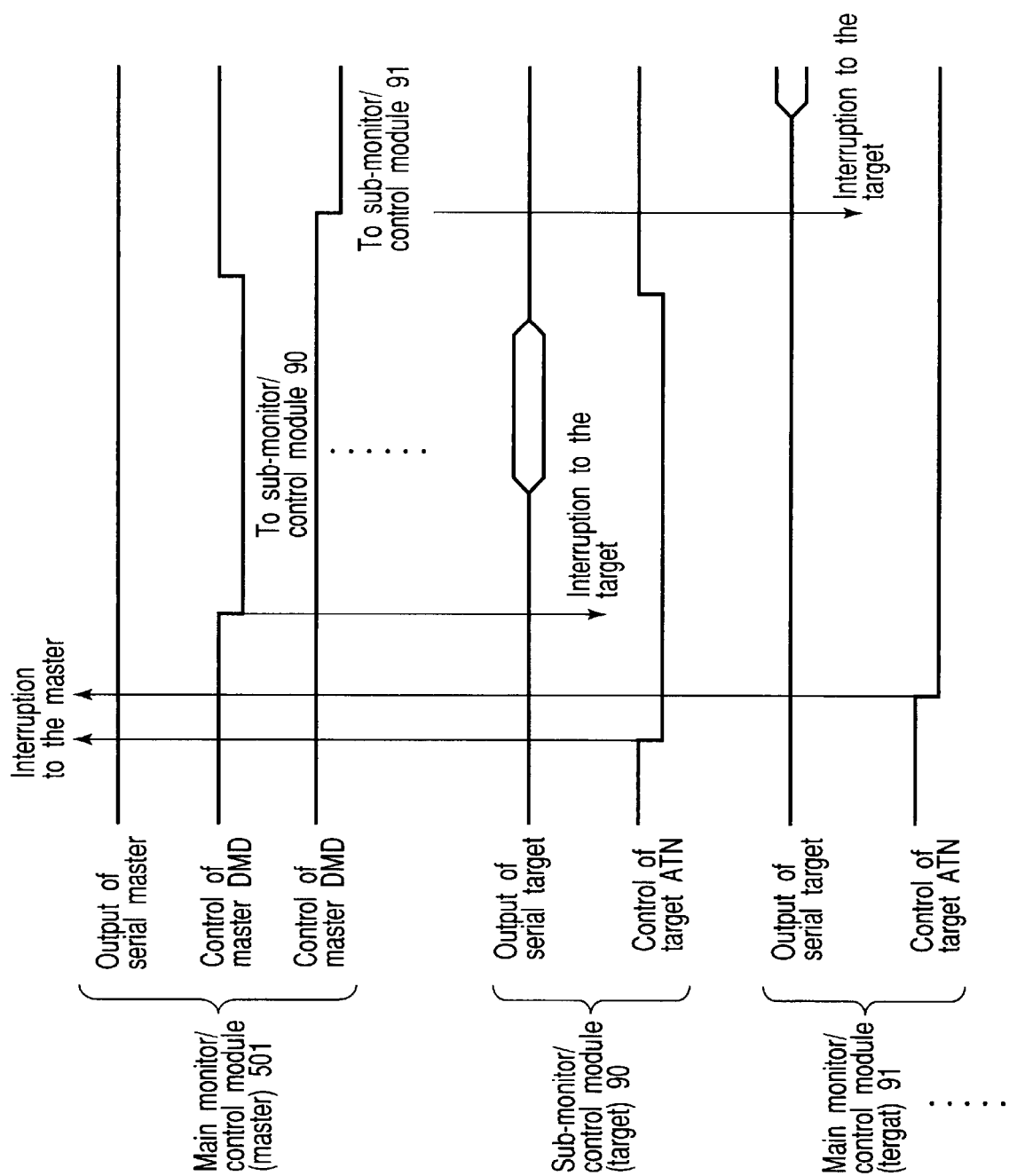
FIG. 10 is a chart showing the transmission sequence of transferring data from a target to the master in the structure shown in FIG. 8.

FIG. 10 is a chart showing the transmission sequence of transferring data from the master to a target in the structure shown in FIG. 8. As FIG. 10 shows, a target that has a data-transfer request determines that the DMD signal line is disabled. Thereafter, the target asserts the ATN control line and transmits the data-transfer request to the master.

Upon receipt of the data-transfer request, the master identifies the other ATN lines, and examines the data-transfer requests transmitted from the targets. In the case of FIG. 10, the sub-monitor/control module 90 that is the first to receive a transfer request has priority. As a result of this, the master asserts the DMD control line of the sub-monitor/control module 90.

When the DMD control line is asserted, the sub-monitor/control module 90 opens the transmission port of the serial input/output bus 10 connected to it. The module 90 supplies the data to the serial input/output bus 10. When the data is completely supplied, the sub-monitor/control module 90 negates the ANT line. The master detects the negation of the ATN line and negates the DMD control line of the sub-monitor/control module 90. Then, the master asserts the DMD control line of the sub-monitor/control module 91 that has been in a stand-by state. The sub-monitor/control module 91 starts transmitting data to the master.

In this embodiment, two auxiliary control lines are provided for each target, in order to control the data transfer through the serial input/output bus 10. The data transfer and the supply of an ACK signal (acknowledgement of receipt) between the master and each target. Therefore, it is unnecessary to transfer messages (e.g., request for data transfer) between the master and the target, in the form of packets. Data can be transmitted through the serial input/output bus 10 at higher speeds than otherwise.

Fifth Embodiment

The fifth embodiment of the invention is concerned with another method in which the SIO control lines SS1 control the data transfer though the serial input/output buses 10.

Figure 11:
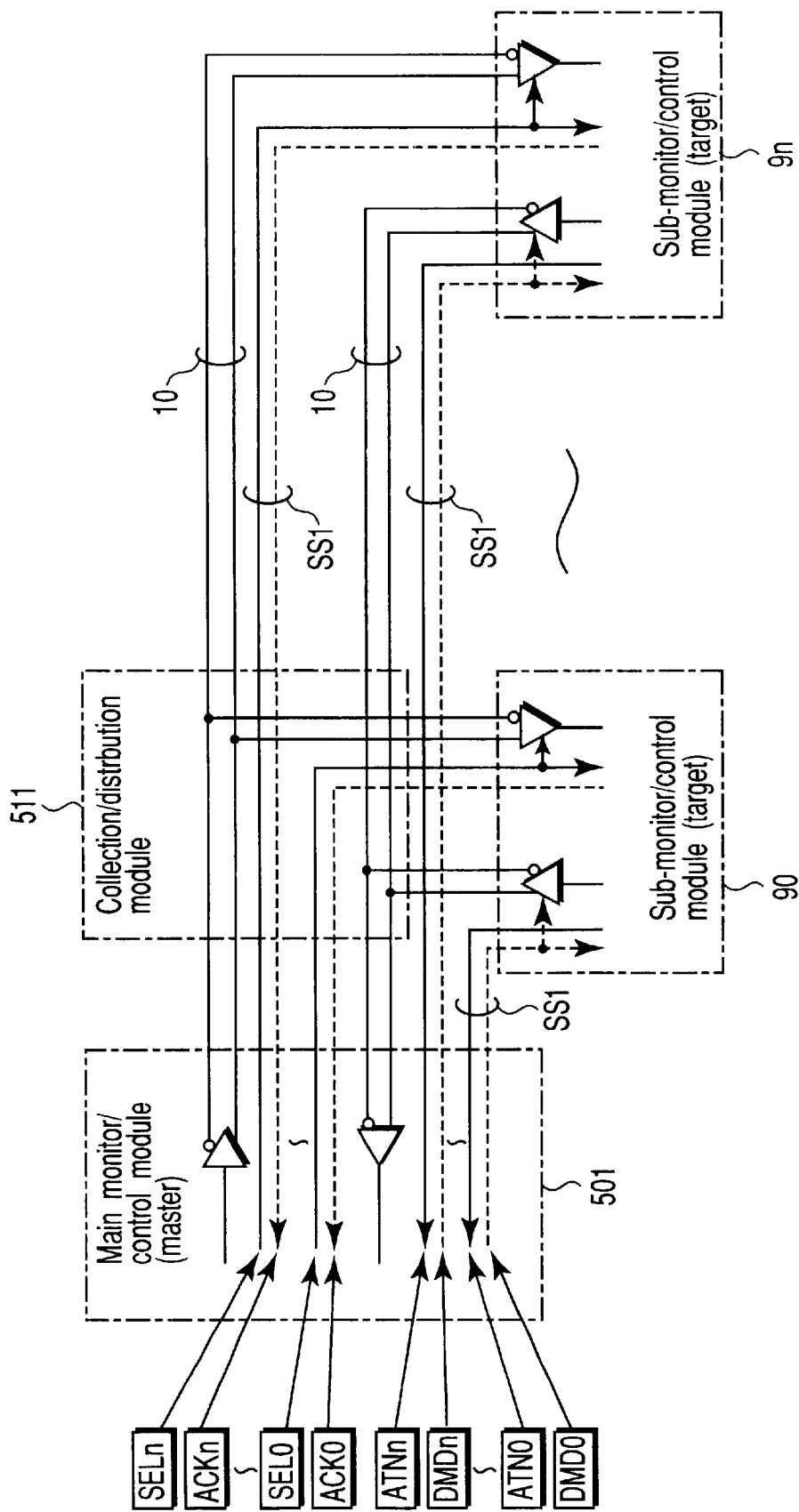
FIG. 11 is a diagram showing the serial input/output bus 10 and SIO control line SS1, which are incorporated in the fifth embodiment of the present invention.

FIG. 11 is a diagram showing the serial input/output bus 10 and SIO control line SS1, which are incorporated in the fifth embodiment. In FIG. 11, the components identical to those shown in FIG. 8 are designated at the same reference numerals. Only the components different from those shown in FIG. 8 will be described.

As illustrated in FIG. 11, SIO control lines SS1 connects the master to the targets, respectively. Each control line SS1 comprises four bi-directional lines. Of these lines, one line is an ATN control line (ATN0, ATN1, . . . or ATNn), and another line is a DMD control line (DMD0, DMD1, . . . or DMDn).

Of the remaining two control lines, one is an SEL (Selection) control line (SEL0, SEL1, . . . or SELn). The master uses the SEL control line to select the transmission port of any target. The other of the remaining two control lines is an ACK (Acknowledge) control line (ACK0, ACK1, . . . or ACKn). The target uses the ACK control line to supply to the master the data showing that the target has received data. That is, the SEL control line is an output line for the master and an input line for the target, whereas the ACK control line is an input line for the master and an output line for the target. The master and each target are connected in one-to-one relation, by the four types of control lines. In the target, the transmission port is opened when the SEL control line is active and when the DMD control line is active.

Figure 12:
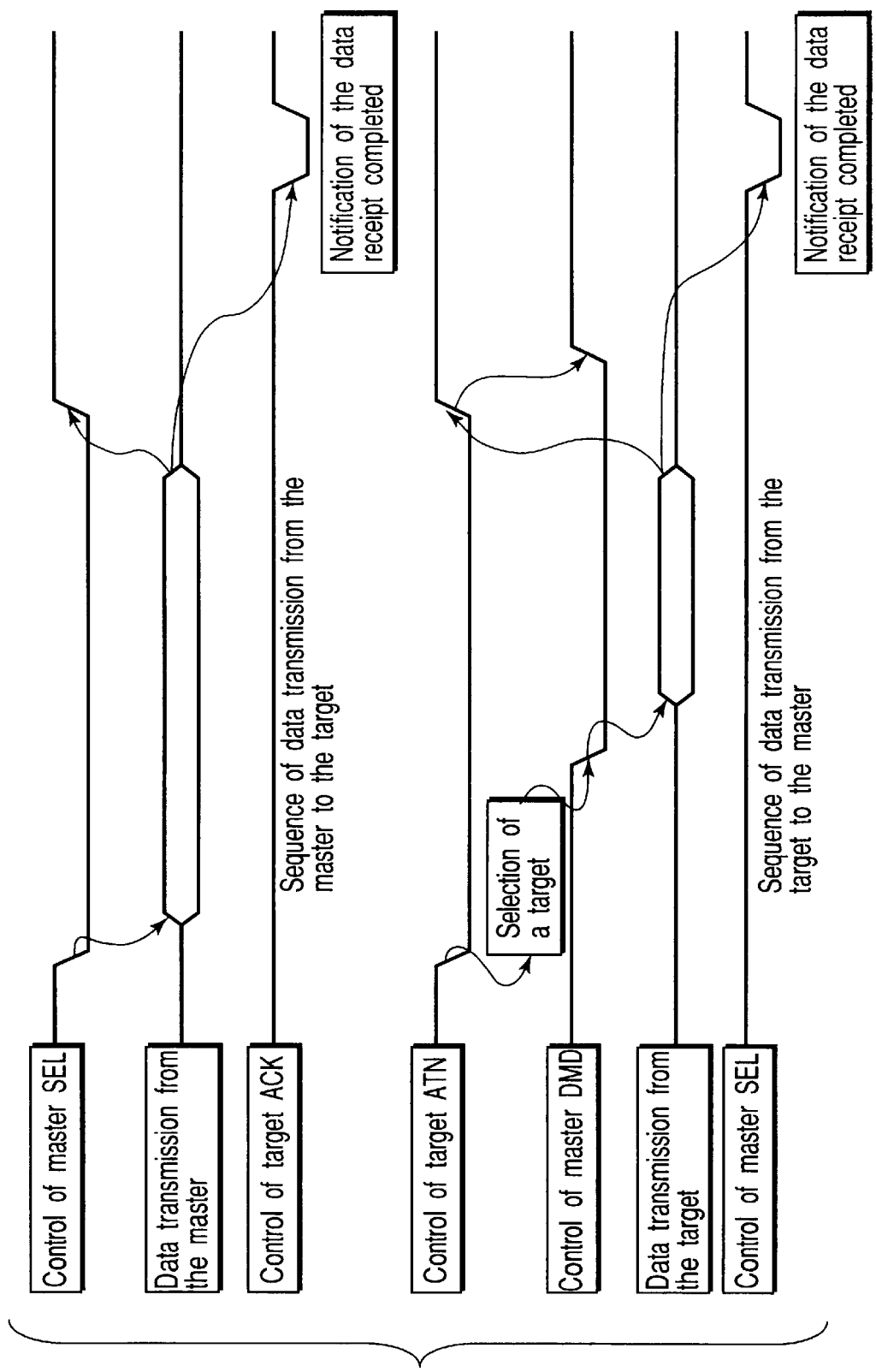
FIG. 12 is a chart depicting the communication sequence of transferring data from the master to a target and transferring data from a target to the master, in the structure shown in FIG. 11.

FIG. 12 is a chart depicting the communication sequence of transferring data from the master to a target and transferring data from the target to the master, in the structure shown in FIG. 11. As shown in FIG. 12, the master asserts the SEL control line of the target to which data should be transferred, so that the data may be transmitted from the master to the target. (Thus, master SEL control is achieved.) The target, to which the SEL control line asserted is connected, has the gate of its reception port opened and is prepared to receive the data transferred from the master. Then, the master transfers the data from its transmission port. Upon completion of the data transfer, the master negates the SEL control line.

The destination target renders the ACK control line active if it has received the data from the master in normal way. The target then transmits data to the master, informing that it has received the data completely.

To transmit data to the master from a target that has a data-transfer request, the target asserts an ATN control line connected to the master. The master monitors the other ATN control lines. If any other target has a data-transfer request, the master examines the data-transmission requests transmitted from these targets and selects one of the targets, from which data may be transmitted to the master. The master then asserts the DMD control line of the target selected.

In the target having the DMD control line asserted, the gate of the transmission port is opened. Data is thereby supplied to the serial input/output bus 10. After transmitting the data, the target negates the ATN line. Upon detecting the negation of the ATN line, the master negates the DMD line. The master then renders the SEL control line active, informing the target that the master has finished receiving the data.

In the fifth embodiment, each control line comprises an SEL control line and an ACK control line, in addition to the ATN control line and the DMD control line. The master uses the SEL control line to select the transmission port of any target, and uses the ACK control line to supply to the master the data showing that the target has received data. The data-transfer request and the ACK data are transmitted from a target to the master through two different control lines, respectively.

The data-transmitting efficiency of the serial input/output buses 10 therefore increases. This apparently expands the data-transmission band. Data can therefore be transmitted through the serial input/output buses 10 at even higher speeds.

Sixth Embodiment

The sixth embodiment of this invention has an additional transmission line for transmitting data showing a trouble in each sub-monitor/control module, besides the transmission line for transferring the monitor data about the signal transmission section between the sub-monitor/control module and the main monitor/control module. Thus, if a trouble, such as power-supply disconnection or board dislocation, occurs in the sub-monitor/control module, the data indicating the trouble will be supplied to the main monitor/control module through the additional transmission line.

FIG. 13 shows the major components of the device incorporated in the sixth embodiment.

As shown in FIG. 13, SIO control lines SS2 are provided between the main monitor/control module 501 and the sub-monitor/control modules 90 to 9n, in addition to serial input/output control lines (SIO control lines) SS1. Each SIO control line SS2 is composed of signal lines, one used to supply data indicating power-supply disconnection, and the other used to supply data showing board dislocation in one sub-monitor/control module (90, 91, . . . or 9n)

Assume that power-supply disconnection takes place in any one of the sub-monitor/control modules 90 to 9n. Then, an alarm indicating the power-supply disconnection is supplied from the sub-monitor/control module to the main monitor/control module 501 through one of the signal lines of the SIO control line SS2. If board dislocation occurs in any one of the sub-monitor/control modules 90 to 9n, an alarm showing the board dislocation is supplied to the main monitor/control module 501 through the other signal line of the SIO control line SS2.

The alarm indicating a trouble in the signal transmission section 1 or any one of the signal transmission sections 21 to 2n can be reliably supplied to the main monitor/control module 501 only if the sub-monitor/control modules 90 to 9n normally function. If the sub-monitor/control modules 90 to 9n fail to work normally, however, the alarm cannot be supplied to the main monitor/control module 501.

In the sixth embodiment, an alarm is supplied via an SIO control signal line to the main monitor/control module 501 if any one of the sub-monitor/control modules 90 to 9n does not normally function due to power-supply disconnection or board dislocation. The main monitor/control module 501 can therefore detect the trouble in any one of the sub-monitor/control modules 90 to 9n, distinguishing the trouble in any one of the signal transmission sections 1 and 21 to 2n. In accordance with the alarm, appropriate measures can be taken to solve the trouble in the sub-monitor/control module.

In the sixth embodiment, the extra signal lines included in the SIO control lines SS1, provided for control the data transfer via the serial input/output buses 10, are used to supply an alarm showing the power-supply disconnection or board dislocation that has occurred in any one of the sub-monitor/control modules 90 to 9n. Hence, additional signal lines need not be provided to supply the alarm indicating the power-supply disconnection or the board dislocation. The wiring configuration of the apparatus can therefore be more simple than otherwise.

Seventh Embodiment

The seventh embodiment of the invention is designed such that each sub-monitor/control module detects a trouble in the power-supply board of each signal transmission section. The alarm indicating the trouble detected is transferred to the main monitor/control module through the LAN or the serial input/output bus, together with the alarms showing other troubles.

Figure 14:
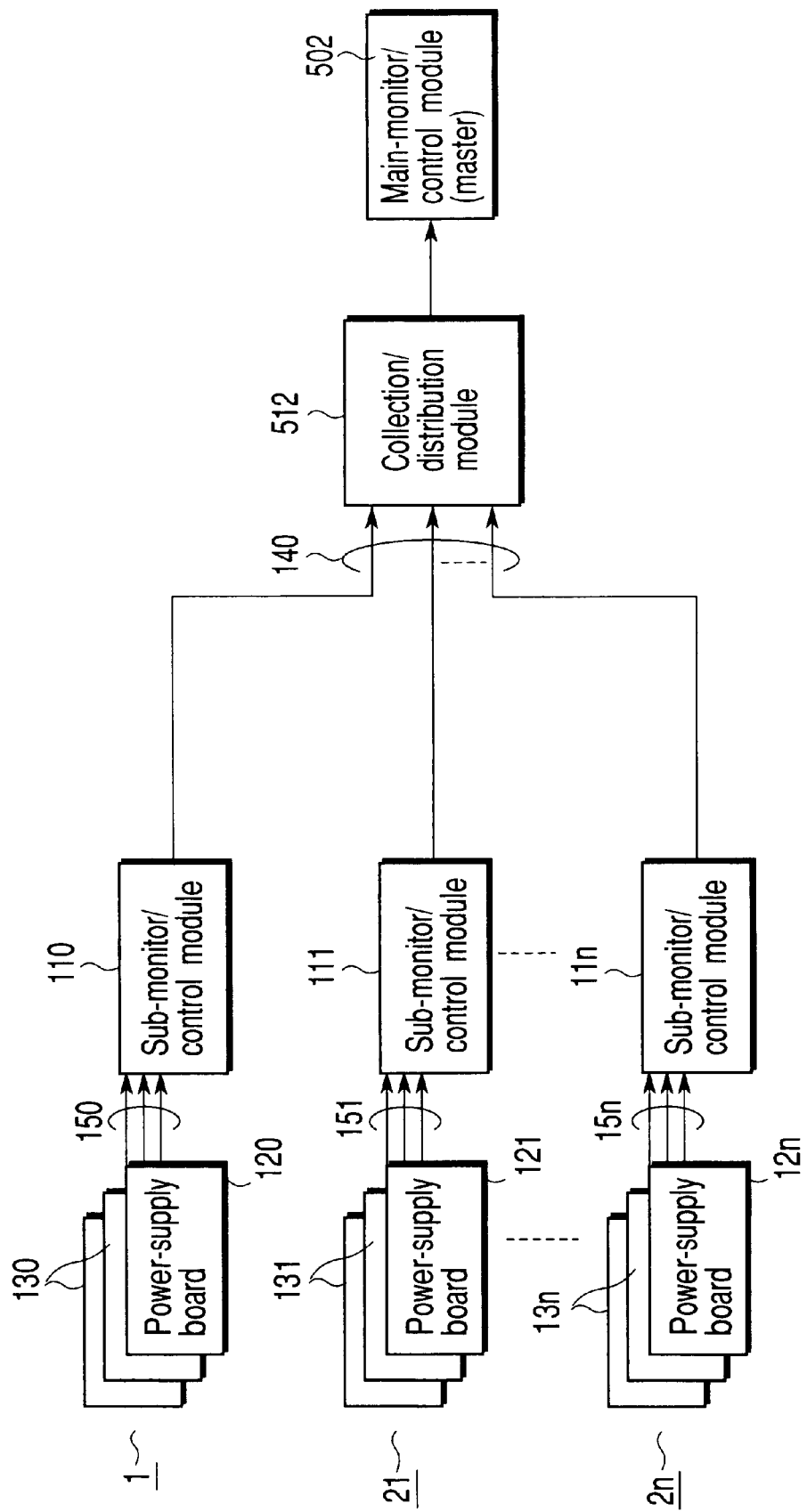
FIG. 14 is a circuit-block diagram showing the structures of the operation administration and maintenance device that is incorporated in the seventh embodiment of this invention.

FIG. 14 is a circuit-block diagram showing the structures of the operation administration and maintenance device that is incorporated in the seventh embodiment.

As illustrated in FIG. 14, each signal transmission section comprises a power-supply boards (120, 121, . . . or 12n) and function boards (130, 131, . . . or 13n). The signal transmission sections 1 and 21 to 2n are connected to sub-monitor/control modules 110 to 11n, respectively. CPU buses 150 to 15n are provided, each connecting one signal transmission section to one sub-monitor/control module. The sub-monitor/control modules 110 to 11n are connected to the main monitor/control module 502 by a star-type LAN that comprises a LAN transmission line 140 and a collection/distribution module 512.

The sub-monitor/control modules 110 to 11n monitor the corresponding signal transmission sections, respectively, via the CPU buses 150 to 15n. The items each sub-monitor/control module monitor are the condition of the power-supply board (120, 121, . . . or 12n) (i.e., power-on or power-off), non-standard power-supply voltage and the presence or absence of the power-supply board, as well as the operating condition of each function boards.

The sub-monitor/control modules 110 to 11n generate data items representing the operating conditions of the signal transmission sections, i.e., the operating conditions of the function boards 130 to 13n and the operating conditions of the power-supply boards 120 to 12n. These data items are supplied through the LAN transmission line 140 to the main monitor/control module 502.

The main monitor/control module 502 classifies the data items transferred via the LAN from the sub-monitor/control modules 110 to 11n, into monitor data items representing the operating conditions of the function boards 130 to 13n and monitor data items showing the conditions of the power-supply boards 120 to 12n. Monitor data items, if any, showing the conditions of the power-supply boards 120 to 12n are processed prior to the other monitor data items.

Thus, when a trouble, e.g., power-supply disconnection, non-standard power-supply voltage, or dislocation of the power-supply board, occurs in the power-supply board (120, 121, . . . or 12n) of any signal transmission section, the sub-monitor/control module 110, 111, . . . or 11n detects this trouble, along with the troubles in the function boards 130 to 13n. The monitor data representing the trouble is transferred from the sub-monitor/control module 110, 111, . . . or 11n via the LAN to the main monitor/control module 502.

The main monitor/control module 502 classifies the data items transferred to it from the sub-monitor/control modules 110 to 11n through the LAN, into the monitor data items representing the operating conditions of the function boards 130 to 13n and the monitor data items representing the conditions of the power-supply boards 120 to 12n. Monitor data items, if any, showing the conditions of the power-supply boards 120 to 12n are processed prior to the other monitor data items.

In the seventh embodiment, the data items showing troubles detected in the power-supply boards 20 to 12n of the signal transmission sections are transferred from the sub-monitor/control modules 110 to 11n via the LAN to the main monitor/control module 502, along with the monitor data items showing the troubles in the function boards 130 to 13n. Therefore, other transmission lines need not be provided to transmit the data items indicating the troubles in the power-supply boards 20 to 12n to the main monitor/control module 502. The wiring configuration of the apparatus can therefore be more simple than otherwise. Moreover, the main monitor/control module 502 can be small and manufactured at low cost, because no communication ports need not be used to receive the monitor data items that represent the troubles in the power-supply boards 20 to 12n.

As described above, in the seventh embodiment, the data items showing troubles detected in the power-supply boards 120 to 12n of the signal transmission sections are transferred from the sub-monitor/control modules 110 to 11n via the LAN to the main monitor/control module 502, along with the monitor data items showing the troubles in the function boards 130 to 13n. If the serial input/output buses 10 are used as communication lines between the main monitor/control module 502 and the sub-monitor/control modules 110 to 11n, as in the third embodiment, they may be used to transfer the data items showing the troubles in the power-supply boards 120 to 12n.

Eighth Embodiment

The eighth embodiment comprises dip switches, each for setting the shelf number of one signal transmission section to the sub-monitor/control module of one signal transmission section. The dip switch is operated, thus setting the shelf number of the signal transmission section, thereby to assign the signal transmission section to one connection port of the collection/distribution module that is controlled by the main monitor/control module.

FIG. 15 is a circuit-block diagram showing the structures of the operation administration and maintenance device that is incorporated in the eighth embodiment of the invention. The components identical to those shown in FIG. 3 are designated at the same reference numerals and will not be described in detail.

Dip switches 150 to 15n, each for setting a shell number, are provided in the sub-monitor/control modules 150 to 15n, respectively. A person in charge of the maintenance of the apparatus manually operates the dip switches 160 to 16n to input the shelf numbers of the signal transmission sections, immediately before using the apparatus or some time after the start of using the apparatus.

Assume that the high-speed signal transmission section and low-speed signal transmission section connected to the sub-monitor/control modules 150 151, respectively, must replace each other to change the structural specification of the apparatus. In this case, the person in charge of maintenance operates the dip switches 160 and 161 provided in the sub-monitor/control modules 150 and 151, respectively, thereby setting the shelf numbers of the low-speed signal transmission section and high-speed signal transmission section. Thereafter, even if the signal transmission section 1 and 21 are interchanged, the relation between the connection ports of the collection/distribution module 51, on the one hand, and the sub-monitor/control modules 150 and 151, on the other, will be altered by means of software.

The physical connection of the LAN transmission line 80 provided between the collection/distribution module 51 and the sub-monitor/control modules 150 and the physical connection of the LAN transmission line 81 provided between the module 51 and the sub-monitor/control modules 151 need not be altered at all. Therefore, the connection layout in the apparatus can be set anew or changed very easily. Further, the wires can be laid out with increased freedom, which reduces the possibility of erroneous wire connection and failure of wire connection. This makes it easy to maintain the apparatus and to enhance the reliability of the apparatus.

Ninth Embodiment

In the ninth embodiment of this invention, each sub-monitor/control module for monitoring and controlling one transmission section comprises a plurality of sub modules. Data is transmitted between the sub modules, thereby to increase the efficiency of transmitting data.

The tributary line LL connected to a transmission section may be thick to transmit data at a speed STM-64 level (Synchronous Transport Module Level 64: 10 Gbps), and the sub-monitor/control module connected to the line LL to monitor and control the transmission section may comprise a plurality of sub modules. In this case, one sub module is actually used, and another is provided as a reserved one or a redundant one. If the sub module actually used has a trouble, the signals to be supplied to it are supplied to the reserved sub module.

With such a configuration, it is necessary to transmit data between the sub modules by the way of the main monitor/control module. In this communication scheme, however, the speed of transferring data is limited, rendering it difficult to accomplish real-time transmission. Particularly, it takes a long time to achieve redundancy switching, which requires high-speed transmission of data.

FIG. 16 is a circuit-block diagram showing the structures of the operation administration and maintenance device that is incorporated in the ninth embodiment. As FIG. 16 shows, the sub-monitor/control module 90 comprises sub modules 90-A and 90-B. Similarly, the sub-monitor/control module 91 comprises sub modules 91-A and 91-B.

This embodiment has an inter-sub-module communication port, which is provided between the sub module 90-A and 90-B to transmit data directly between the sub modules 90-A and 90-B. The embodiment has an inter-sub-module communication port, too, which is provided between the sub module 91-A and 91-B to transmit data directly between the sub modules 91-A and 91-B. A plurality of sub modules may be provided for any other sub-monitor/control module. If this is the case, an inter-sub-module communication port connects the sub modules.

In this structure, the main monitor/control module 501 may not need to perform its function and the sub modules may cooperate to monitor and control the transmission section. Then, the inter-sub-module communication ports are utilized whenever necessary.

Assume that a trouble occurs in, for example, the sub module 90-A, and the signal line needs to be connected to the sub module 90-B. Then, the sub modules 90-A and 90-B can transmit and receive message data to and from each other, not though the main monitor/control module 501. The redundancy switching between the sub modules 90-A and 90-B can therefore be performed at high speeds.

Additionally, data need not be transferred between the sub modules via the main monitor/control module 501. Therefore, the working load on the main monitor/control module 50 can be decreased. This can enhance the reliability of the monitoring/controlling function.

The present invention is not limited to the embodiments described above. In each embodiment described above, a star-type LAN is used as a signal transmission line that connects each sub-monitor/control module to the main monitor/control module. The star-type LAN may be replaced by a ring-type LAN. If a ring-type LAN is used, the wiring configuration can be further simplified, because the wiring of the ring-type LAN remains unchanged even if many signal transmission lines are provided.

Each of the embodiments described above is designed for use in SDH transmission apparatuses. Nonetheless, the technical concept of the invention is not limited to SDH apparatuses. Rather, this invention can be applied to, for example, SONET (Synchronous Optical Network) that is the standard network in the United States.

At present, the transmission apparatus that transmits and receives signals in the form of electric signals (hereinafter referred to as ADM (Add Drop Multiplexer)) is predominant. In the future, a transmission apparatus that transmits and receives signals in the form of optical signals (hereinafter called OADM (Optical Add Drop Multiplexer) will be predominant instead.

ADM uses paths that are "time-divided and multiplexed slots," whereas OADM uses paths that are "optical signals having different frequencies, each frequency-multiplexed." ADM and OADM thus differ from each other. In the ADM, multiplexing is effected in units of time slots. In the OADM, multiplexing is carried out in units of frequencies. The present invention can be applied to the new node (i.e., OADM), too. This is because the invention is not based on the principle that "the paths are time-divided and multiplexed."

Moreover, the type of the signal transmission lines connecting the main monitor/control module to the sub-monitor/control modules, the structure of the lines, the number of the lines provided, the structure of the apparatus can be changed or modified in various ways, without departing from the scope and spirit of the invention.

As has been described, in the apparatus of the invention, the first transmission line of bus-type connects the first monitor/control unit to a plurality of transmission units, so that the first monitor/control unit may monitor, in real time, the operating condition of each transmission unit. Further, the second transmission line of lower speed than the first transmission line connects the second monitor/control unit to the first monitor/control unit. Therefore, the second monitor/control unit collects the monitor data items acquired in the first monitor/control unit and concerning the transmission units, at a given timing through the second transmission line. The second monitor/control unit then monitors and controls the components of the apparatus in accordance with the monitor data items thus collected.

The present invention can provide a digital signal transmission apparatus in which the control concerning the operation, administration and maintenance can be efficiently performed, without making the control traffic become busy, and which can therefore be simple in structure and operate with high reliability.

In view of this, the invention is effective in the field of optical, submarine cable systems, particularly networks based on SDH/SONET standards.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A digital signal transmission apparatus which has a plurality of transmission units each including a line connection unit and in which the transmission units transmit and receive multiplexed digital signals to and from an external transmission apparatus, said digital signal transmission apparatus comprising:

a first transmission line having a first transmission speed and a second transmission line having a second transmission speed lower than the first transmission speed;

first monitor/control units connected by the first transmission line to said plurality of transmission units, respectively, for monitoring an operating condition of each transmission unit in real time and through the first transmission line; and a second monitor/control unit connected to the first monitor/control unit by the second transmission line and a third transmission line having a higher transmission speed than the second transmission line, wherein said first monitor/control units comprises:

means for classifying the monitor data of each transmission unit into a first monitor data item of high emergency and a second monitor data of low emergency; and means for transferring the first monitor data to the second monitor/control unit through the third transmission line and transferring the second monitor data to the second monitor/control unit through the second transmission line, and said second monitor/control unit comprises:

means for performing, in real time, a necessary process on the basis of the first monitor data transferred through the third transmission line; and means for performing, at a given timing, a necessary process on the basis of the second monitor data transferred through the second transmission line.

2. The digital signal transmission apparatus according to claim 1, wherein the second transmission line is constituted by a local area network, the third transmission line is constituted by a serial input/output bus for transferring monitor data and a control line provided for the serial input/output bus, and a collection/distribution unit collects and distributes the lines of the local area network and the lines of the serial input/output bus.

3. The digital signal transmission apparatus according to claim 2, wherein the control lines of the serial input/output bus include first auxiliary control lines and second auxiliary control lines that connect the second monitor/control unit to the first monitor/control units, the first auxiliary control lines are used when the first monitor/control units supply a transmission request to the second monitor/control unit, thereby to transmit data to the second monitor/control unit and when the first monitor/control units inform the second monitor/control unit of the receipt of data transferred from the second monitor/control unit, and the second auxiliary control liens are used to inform any one of the first monitor/control units that data is transmitted to the fist monitor/control unit from the second monitor/control unit.

4. The digital signal transmission apparatus according to claim 2, wherein the control lines of the serial input/output bus include first to fourth auxiliary control lines that connect the second monitor/control unit to the first monitor/control units, respectively, the first auxiliary control line is used to supply a transmission request, thereby to transmit data from the first monitor/control units to the second monitor/control unit, the second auxiliary control line is used to inform any one of the first monitor/control units that the second monitor/control unit transfers data to the first monitor/control unit, the third auxiliary control line is used to inform the second monitor/control unit that any one of the first monitor/control units has received data from the second monitor/control unit, and the fourth auxiliary control line is used to select one of the transmission ports of the first monitor/control unit, thereby to transfer data from the second monitor/control unit to any one of the first monitor/control units.

5. The digital signal transmission apparatus according to claim 1, wherein each of the transmission units have a power-supply module, each of the first monitor/control units monitors the operation condition of the power-supply module as one monitor item of the transmission unit and comprises means for transferring the first monitor data to the second monitor/control unit through the third transmission line, said first monitor data containing data representing a trouble in the power-supply module.

6. The digital signal transmission apparatus according to claim 1, wherein, when the first monitor/control units are physically connected to a plurality of connection ports that the second monitor/control unit has, each of the first monitor/control units comprises input means for inputting identification data of a transmission unit connected to the first monitor/control units and correlation means for correlating the physical connection to the identification data input by the input means.

7. The digital signal transmission apparatus according to claim 1, wherein, when at least one of the first monitor/control units has a plurality of sub-units that are redundant with respect to one another, data transmission ports are provided and connect the sub-units to one another.

* * * * *